United States Patent
Buffin

(10) Patent No.: US 10,594,995 B2
(45) Date of Patent: Mar. 17, 2020

(54) IMAGE CAPTURE AND DISPLAY ON A DOME FOR CHROMA KEYING

(71) Applicant: BUF CANADA INC., Montreal (CA)

(72) Inventor: Pierre Louis Charles Buffin, Paris (FR)

(73) Assignee: BUF CANADA INC., Montreal (CA)

( * ) Notice: Subject to any disclaimer, the term of this patent is extended or adjusted under 35 U.S.C. 154(b) by 33 days.

(21) Appl. No.: 15/840,614

(22) Filed: Dec. 13, 2017

(65) Prior Publication Data

US 2018/0167596 A1    Jun. 14, 2018

Related U.S. Application Data

(60) Provisional application No. 62/433,479, filed on Dec. 13, 2016.

(51) Int. Cl.
| | |
|---|---|
| H04N 5/232 | (2006.01) |
| H04N 9/75 | (2006.01) |
| H04N 9/31 | (2006.01) |
| H04N 9/77 | (2006.01) |

(52) U.S. Cl.
CPC ............ *H04N 9/75* (2013.01); *H04N 9/3147* (2013.01); *H04N 9/3185* (2013.01); *H04N 9/77* (2013.01); *H04N 5/23238* (2013.01)

(58) Field of Classification Search
None
See application file for complete search history.

(56) References Cited

U.S. PATENT DOCUMENTS

| | | | | |
|---|---|---|---|---|
| 5,696,892 A | * | 12/1997 | Redmann | G06T 13/20 345/473 |
| 5,737,031 A | * | 4/1998 | Tzidon | H04N 5/222 348/587 |
| 6,191,812 B1 | * | 2/2001 | Tzidon | H04N 5/222 348/135 |
| 6,343,184 B1 | | 1/2002 | Huebner | |
| 6,538,396 B1 | | 3/2003 | Vlahos et al. | |
| 6,552,744 B2 | * | 4/2003 | Chen | H04N 5/23293 348/218.1 |
| 6,685,326 B2 | | 2/2004 | Debevec et al. | |
| 7,044,613 B2 | | 5/2006 | Debevec | |
| 7,164,462 B2 | | 1/2007 | Lamarre | |
| 7,894,713 B1 | | 2/2011 | Clark | |
| 8,145,048 B2 | | 3/2012 | Messier | |

(Continued)

*Primary Examiner* — Mohammad J Rahman
(74) *Attorney, Agent, or Firm* — Benoit & Cote, Inc.; C. Marc Benoit

(57) ABSTRACT

There is described a method and an apparatus for rendering a realistic lighting on a subject to undergo chroma-key compositing into a scene environment. The method comprises providing translucent screens forming a closed environment around the subject and undergoing projection from outside to provide the realistic lighting, and identifying an area of the screens that is behind the subject and forming the contour thereof from a perspective of the camera. A withdrawable background is projected for the areas of the screens corresponding to behind the subject and to the contour of the subject, projecting, such that when an image of the subject is taken using the camera, the withdrawable background forming the contour of the subject is used to isolate the subject in the image of the subject to perform chroma-key composition.

18 Claims, 20 Drawing Sheets

(56) References Cited

U.S. PATENT DOCUMENTS

| | | |
|---|---|---|
| 8,769,881 B2 | 7/2014 | O'Farrill |
| 9,264,627 B2 | 2/2016 | Holmes et al. |
| 2001/0048483 A1* | 12/2001 | Steinberg .............. H04N 5/2224 348/587 |
| 2003/0038922 A1* | 2/2003 | Ferrell .................... G03B 21/32 352/85 |
| 2004/0150641 A1 | 8/2004 | Duiker |
| 2005/0111841 A1 | 5/2005 | Geller |
| 2006/0033824 A1* | 2/2006 | Nicholson .............. H04N 5/272 348/265 |
| 2006/0114356 A1 | 6/2006 | Didow et al. |
| 2006/0285836 A1 | 12/2006 | Coppola |
| 2008/0084508 A1* | 4/2008 | Cole ....................... H04N 5/275 348/744 |
| 2008/0166111 A1 | 7/2008 | Didow et al. |
| 2008/0246777 A1 | 10/2008 | Swanson et al. |
| 2008/0247727 A1 | 10/2008 | Hochman et al. |
| 2009/0042654 A1* | 2/2009 | Barber .................... A63F 13/10 463/42 |
| 2010/0128980 A1 | 5/2010 | Pandya |
| 2010/0277471 A1* | 11/2010 | Beato ................... G06K 9/4652 345/419 |
| 2011/0044552 A1 | 2/2011 | Yen et al. |
| 2011/0206279 A1* | 8/2011 | Carmi ....................... H04N 9/75 382/166 |
| 2012/0050606 A1 | 3/2012 | Debevec et al. |
| 2013/0002815 A1* | 1/2013 | Smoot ................... G06T 19/006 348/43 |
| 2013/0016099 A1* | 1/2013 | Rinard .................... G06T 15/00 345/420 |
| 2014/0104314 A1* | 4/2014 | David ..................... G06T 11/60 345/632 |
| 2014/0178029 A1* | 6/2014 | Raheman ............... H04N 5/772 386/224 |
| 2014/0354645 A1* | 12/2014 | Imber ..................... G06T 15/60 345/426 |
| 2015/0348326 A1* | 12/2015 | Sanders ................ G06T 19/006 345/633 |
| 2015/0350628 A1* | 12/2015 | Sanders ................. G06T 15/08 345/419 |
| 2016/0301813 A1* | 10/2016 | Swire ................. H04N 1/00188 |
| 2017/0056775 A1* | 3/2017 | Barber .................. A63F 13/213 |
| 2017/0150068 A1* | 5/2017 | David .................... H04N 5/275 |

* cited by examiner

IMAGE CAPTURE AND DISPLAY ON A DOME FOR CHROMA KEYING

CROSS-REFERENCE TO RELATED APPLICATIONS

This application claims priority from U.S. provisional patent application No. 62/433,479 filed on Dec. 13, 2016, the specification of which is hereby incorporated by reference.

BACKGROUND

(a) Field

The subject matter disclosed generally relates to visual effects. More specifically, it relates to methods and apparatuses for chroma key compositing.

(b) Related Prior Art

There is described herein embodiments of an apparatus and a method for performing chroma-key compositing in motion picture.

Green screens have long been used in chroma-keying for replacing the background behind a subject by a scene where the subject was not filmed to give the illusion that the subject was in this scene. By providing the background as a green screen behind the subject, the subject is filmed and the substantially uniformly colored background is then replaced by the scene in which the subject is to be inserted in the composited image. Chroma-key compositing may also use any other colored backgrounds such as blue screens, as long as a good extraction level with the subject can be obtained.

This technique can be used for various reasons, for example if the scene environment involves some dangers (edge of a skyscraper rooftop, on a cliff), if it is far away (top of a mountain, desert, or any other place where sending actors and a team is difficult), if actors are unavailable on a given day, etc.

Green screen shooting is however costly and requires a trained team. Constraints need to be respected, which complicates filming.

The actor (i.e., the subject) must be filmed with a camera having the same position as the camera that filmed the scene in which the subject is to be inserted.

The green screen must be uniformly lit and positioned at a given distance behind the actor, while making sure the green screen covers the whole area where the actor (subject) needs to move. Since the camera may also move during filming, the total area that needs to be covered by a green screen can be quite extensive. Uniform lighting of the green screen therefore becomes more difficult. Green color spilling onto the subject is also much more likely to occur. This green color spilling is an undesirable effect; it must be removed from the subject in post-production.

Another challenge encountered with green screens is to provide adequate lighting on the subject being filmed so that the final result appears realistic, especially without resorting to costly and time-consuming post-production corrections. If the subject is not illuminated by the same lighting as it would in the scene where it is inserted after compositing, the viewer will realize that the subject was not filmed in the scene because the lighting on the subject is inconsistent with its environment in the composited image and the composited image will not appear realistic. The lighting on the actors must therefore be similar to the one in the scene in which the subject is to be inserted.

U.S. Pat. No. 7,044,613 entitled "Realistic scene illumination reproduction", issued to Debevec, uses LEDs to light a subject with more realistic illumination. The illumination of a subject in an environment is captured and reproduced onto the real subject being filmed using LED projectors which directly project light onto the subject. When the subject is filmed with the withdrawable background behind, the illumination on the subject should substantially match the illumination he would have had in the scene. The composited image therefore appears more realistic because illuminations of the subject and of the scene match in color and intensity.

The filming is therefore full of constraints, and time-consuming post-production work must still be performed to correct the images to make sure the composited images are realistic.

SUMMARY

According to an aspect of the invention, there is provided a method for rendering a realistic lighting on a subject to undergo chroma-key compositing into a scene environment, the method comprising:
  providing screens around the subject; and
  projecting an image from the scene environment onto the screens,
wherein the projecting causes relighting, by the screens, of the image from the scene environment toward the subject to light the subject with illumination as in the scene environment.

According to an embodiment, the screens are translucent.

According to an embodiment, projecting the image from the scene environment is performed by projectors.

According to an embodiment, projecting the image from the scene environment comprises:
  dividing a panoramic image of the scene environment into a plurality of sub-images, each sub-image to be projected by a respective projector;
  for each sub-image, determining a respective area on the screens where the sub-image is to be projected;
  by each one of the projectors, projecting a respective sub-image onto the respective area on the screens.

According to an embodiment, there is further provided:
  identifying a location of a camera with respect of to the subject and an area of the screens that is behind the subject from a perspective of the camera;
  identifying an area of the screens that corresponds to a contour of the subject from the perspective of the camera;
  for the areas of the screens corresponding to behind the subject and to the contour of the subject, projecting, instead of the image from the scene environment, a withdrawable background.

According to an embodiment, projecting the withdrawable background comprises projecting a uniform color chosen from green or blue.

According to an embodiment, there is further provided:
  taking an image of the subject using the camera;
  using the withdrawable background forming the contour of the subject to isolate the subject in the image of the subject to perform chroma-key composition.

According to an embodiment, providing the screens around the subject comprising concentrically placing the screens substantially at an equal distance from a point where the subject is to be positioned.

According to an embodiment, projecting the image from the scene environment comprises continually projecting the image which changes over time.

According to an embodiment, providing the screens comprises providing screens contiguously all around the subject such that adjacent screens share their edges to form a dome.

According to an embodiment, there is further provided, prior to projecting the image from the scene environment, capturing the image from the scene environment.

According to an embodiment, capturing the image from the scene environment comprises capturing a HDR 360° panoramic image.

According to another aspect of the invention, there is provided a method for rendering a realistic lighting on a subject to undergo chroma-key compositing into a scene environment, the method comprising:

providing screens around the subject to provide the realistic lighting;

identifying a location of a camera with respect of to the subject and an area of the screens that is behind the subject from a perspective of the camera;

identifying an area of the screens that corresponds to a contour of the subject from the perspective of the camera;

for the areas of the screens corresponding to behind the subject and to the contour of the subject, projecting a withdrawable background.

taking an image of the subject using the camera;

using the withdrawable background forming the contour of the subject to isolate the subject in the image of the subject to perform chroma-key composition.

According to an embodiment, the realistic lighting is provided by projecting an image from the scene environment onto the screens, wherein the projecting causes relighting, by the screens, of the image from the scene environment toward the subject to light the subject with illumination as in the scene environment.

According to an embodiment, there is further provided adjusting a light intensity of the withdrawable background depending on a light intensity of the scene environment.

According to another aspect of the invention, there is provided an apparatus for rendering a realistic lighting on a subject to undergo chroma-key compositing into a scene image, the apparatus comprising:

screens which are translucent, for substantially surrounding a subject located therein and defining an outside; and projectors for projecting on the screens;

the screens comprising an opening to allow viewing the subject from the outside, the subject being illuminated according to the scene image received by the screens from the projectors.

According to an embodiment, the screens comprise adjacent screens which share their edges.

According to an embodiment, the screens are concentrically located around the subject, substantially at an equal distance from a point where the subject is to be positioned.

According to an embodiment, screens are contiguous all around the subject to form a substantially closed dome.

According to an embodiment, the dome has a shape of a polyhedron or a truncated polyhedron.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The aforementioned technique described in U.S. Pat. No. 7,044,613 however suffers from some drawbacks. In U.S. Pat. No. 7,044,613, the green screen must be used in a conventional manner, where a green panel is installed behind the subject. The subject is then illuminated directly with LED projectors to reproduce the illumination scene on the surface of the subject. However, the green screen is also lit by the LED projectors. This situation causes green color spilling back onto the subject. This green color spilling is an undesirable effect; it must be removed from the subject in post-production.

U.S. Pat. No. 7,044,613 further describes a technique for green screen replacement that uses infrared radiations and two cameras filming through a two-way mirror. This technique is however complicated due to the use of infrared radiations and requires time-consuming post-production work for finalization of chroma-keying.

Furthermore, LEDs illuminating the subject does not work in every circumstance. For example, when transparent and reflective subjects are directly lit with LEDs, the result does not appear realistic. Moreover, if the camera pointed toward a reflective portion of the subject that is reflecting a given LED, flares can appear in the image captured by the camera because of a direct illumination of the camera by this given LED (via reflection on the subject). This technique is best suited for light projection on faces and skin, and may give deceiving results in other circumstances. This is because this prior art technique uses LEDs to reproduce the lighting on a subject's surface, but fails to reproduce the environment itself because a realistic environment is rarely made of active light sources.

There is described below a method and an apparatus, embodied as a controlled lighting stage tool that relights a captured scene illumination, that can overcome these drawbacks and work with any type of object, including transparent and reflective objects, for an improved integration of a subject 15 on a scene environment (background plate) 30. The technique described below is thus more general in the possible applications in that there is no limitation on the type of subject, as long as it can fit therein. The method can minimize the green color spilling back on the subject, does not requires complex equipment as a traditional green screen and minimizes the post-production work needed for the chroma key composition, thereby achieving composition in a fast and very realistic fashion.

Figure 1:
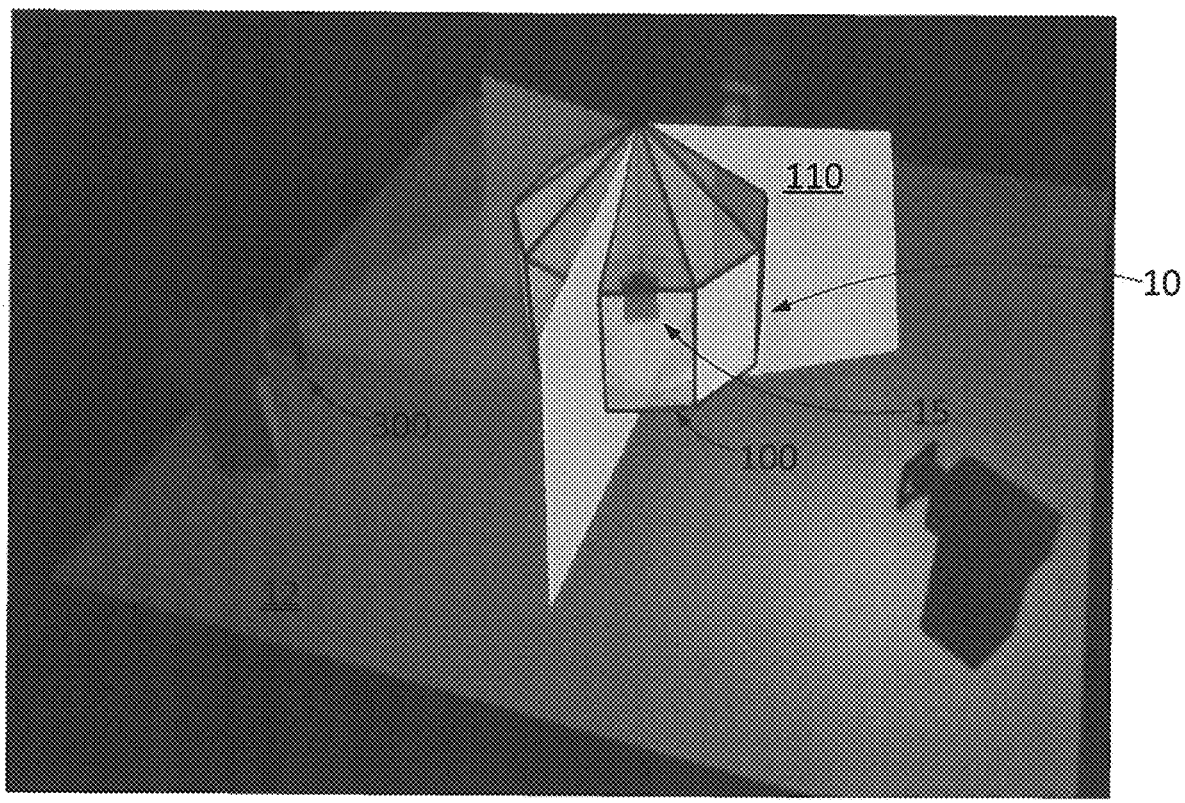
FIG. 1 is a perspective view of a simplified dome, according to an embodiment.
Figure 2:
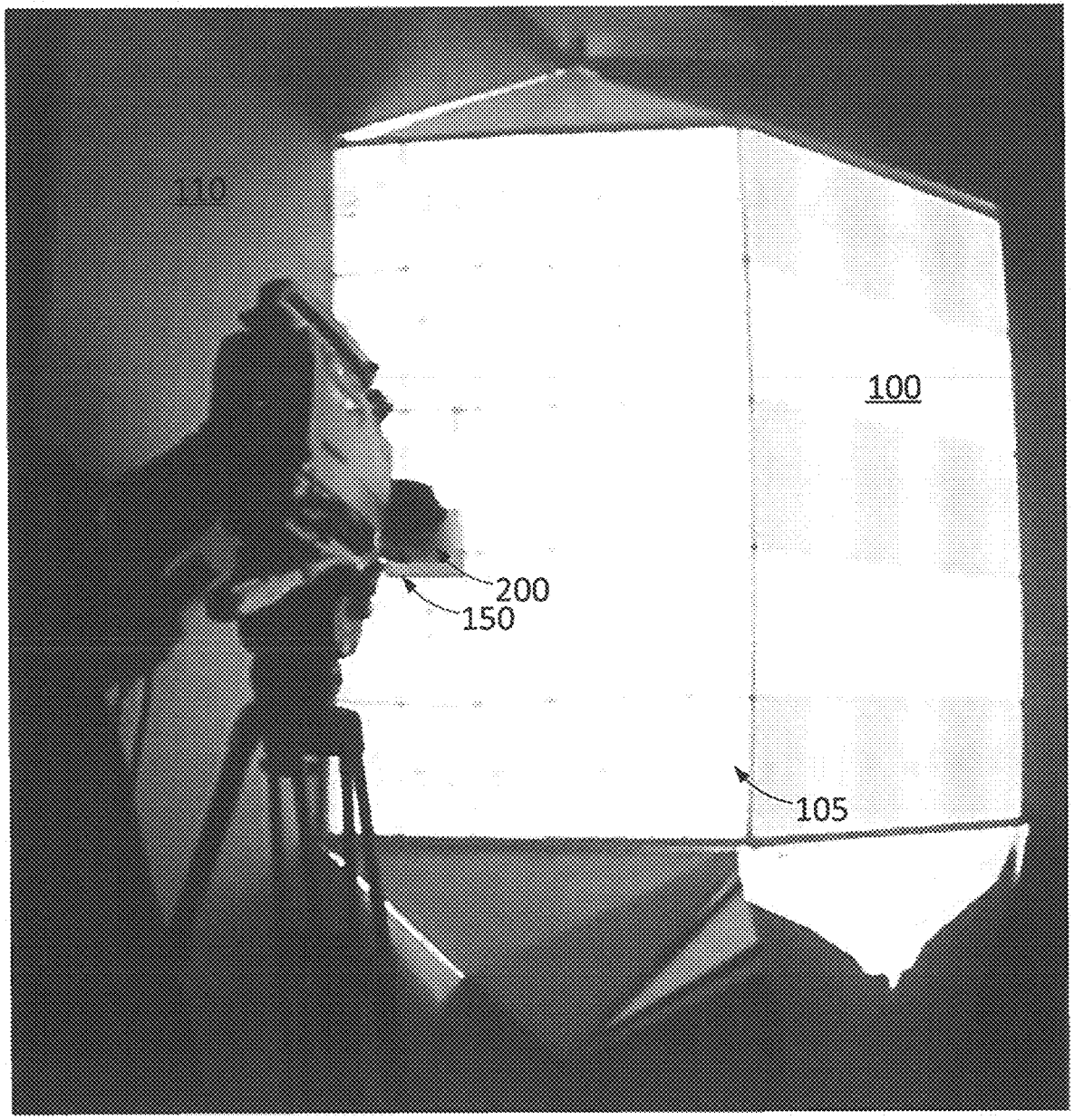
FIGS. 2-3 are pictures of the dome, according to an embodiment.
Figure 3:
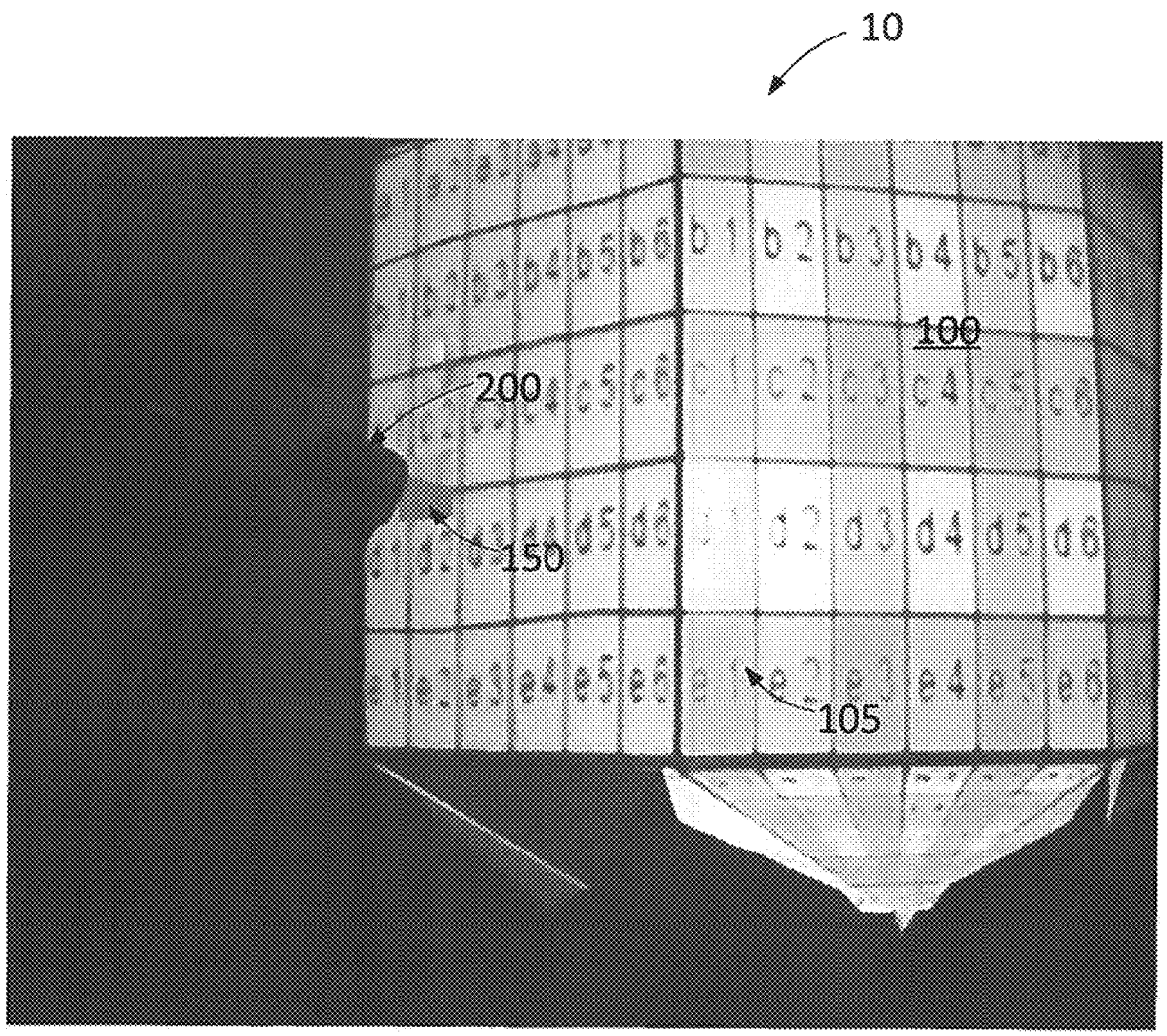
Figure 4:
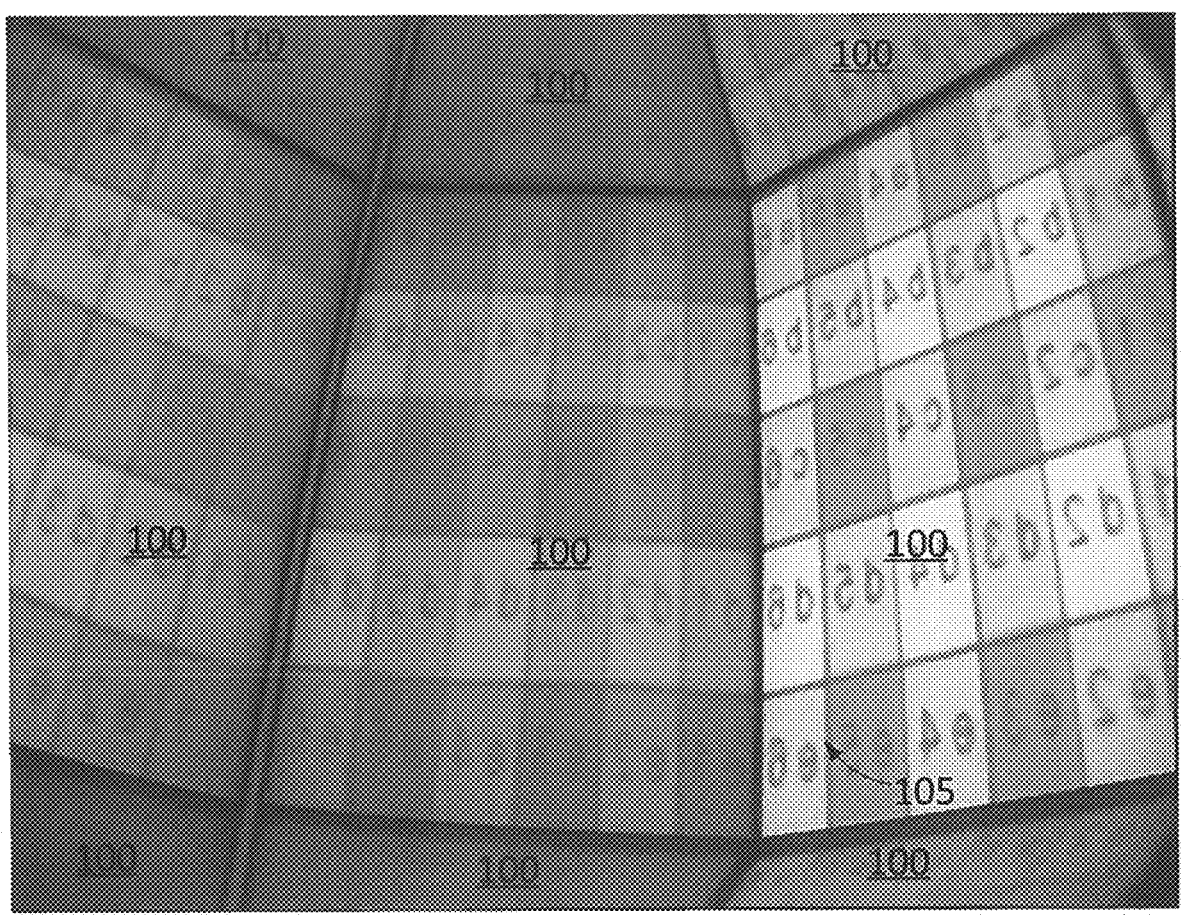
FIG. 4 is a picture of the dome from inside, according to an embodiment.

The apparatus described herein, shown in a simplified version (i.e., only three projectors 300) in FIG. 1 and also in FIGS. 2-4, comprises a dome 10 made of screens 100, for example translucent screens. The screens making up the dome are used for relighting a subject inside the dome to reproduce the lighting environment from an image captured in the scene to be composited with the subject. According to a preferred embodiment, the image is a high-dynamic range image (HDRI).

The subject 15 is located in the dome 10, the screens being used for receiving scene illumination projected thereon, the scene illumination including a "green" color spot 20 located behind and around the subject 15 (i.e., covering a contour of the subject) when viewed from a camera 200. Since the screens 100 are translucent, they let received light go therethrough, i.e., they relight the subject with the same scene illumination they received. This is done in a more diffuse manner than with direct LED lighting, thereby eliminating flares and problems with reflective or transparent subjects. Relighting refers to the fact that an image is formed by the projectors 300 on the outside of the screens 100, and then diffused through the translucent material of the screens such that this image formed on the outside of the screens 100 indirectly illuminates the subject 15 inside the dome 10.

It should be noted that the "green" background remains in use. It is advantageous in that traditional compositing algorithms, which have nonetheless proven to be robust, can still be used. This "green" color spot or background does not have to be green. It can be any suitable color (e.g., blue) or identifiable pattern as long as it is withdrawable from a composited image. Similarly, the terms "green-color spilling" used in this description should be interpreted as the spilling back onto the subject of the withdrawable background which can be a color other than green, such as blue, or can be a pattern.

If the withdrawable background is kept as a green color or blue color, the process of isolating the subject 15 is made easier because extraction algorithms are widely used and have proven their efficiency and quality.

Figure 5:
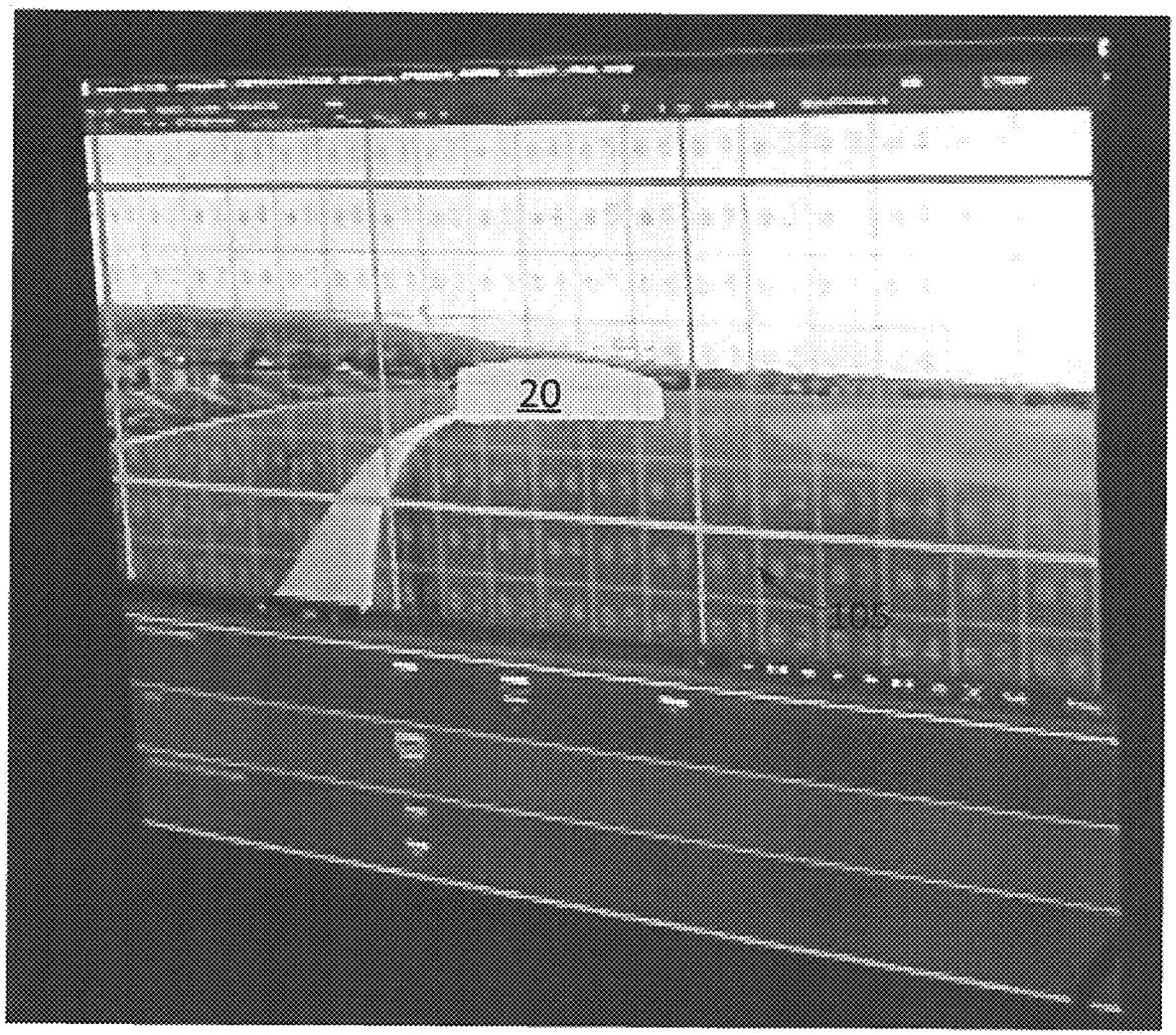
FIG. 5 is a picture of the mapping of the projected images done by the production team, according to an embodiment.
Figure 6:
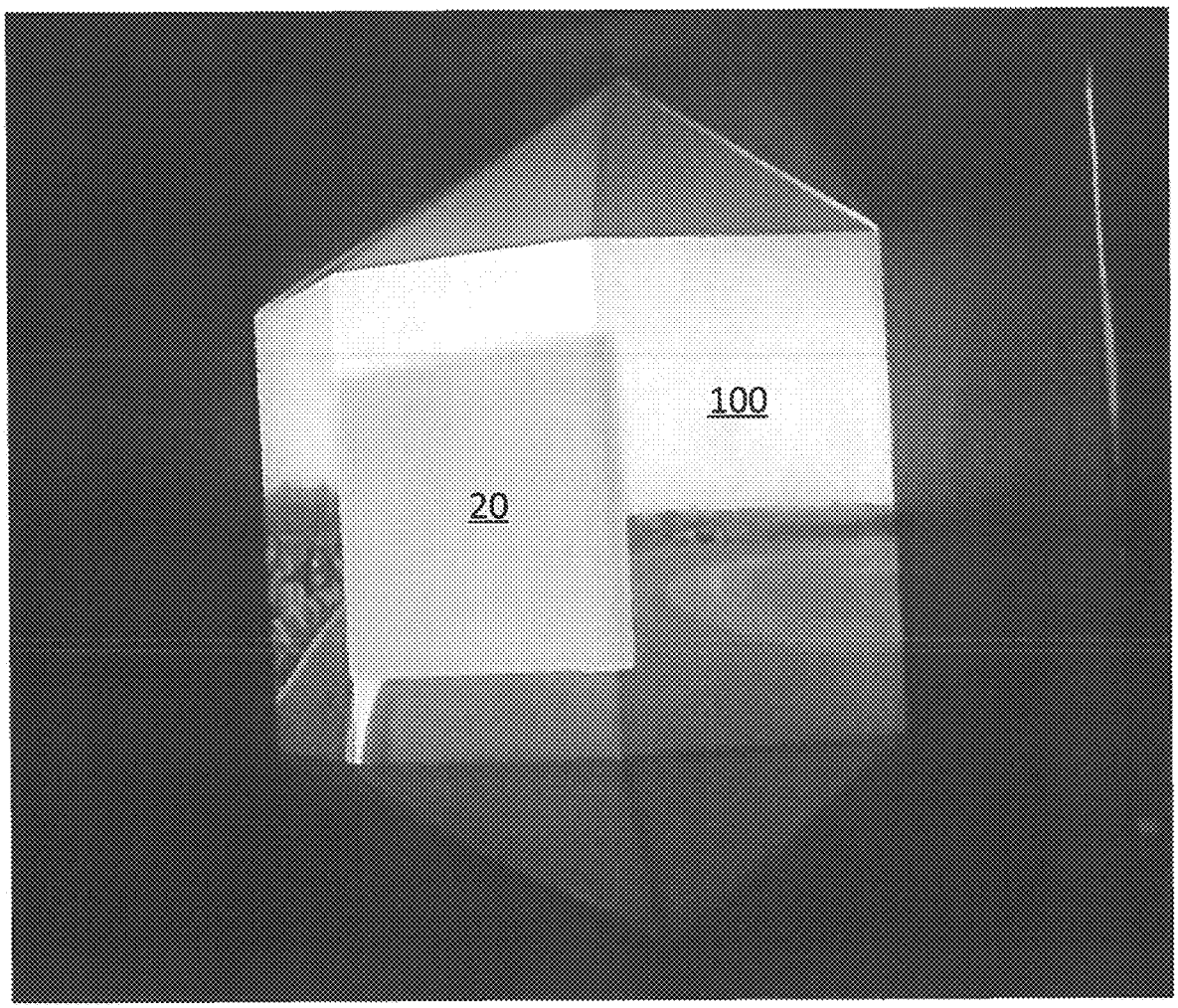
FIG. 6 is a picture of the mapping of the projected images on the dome, according to an embodiment.
Figure 7:
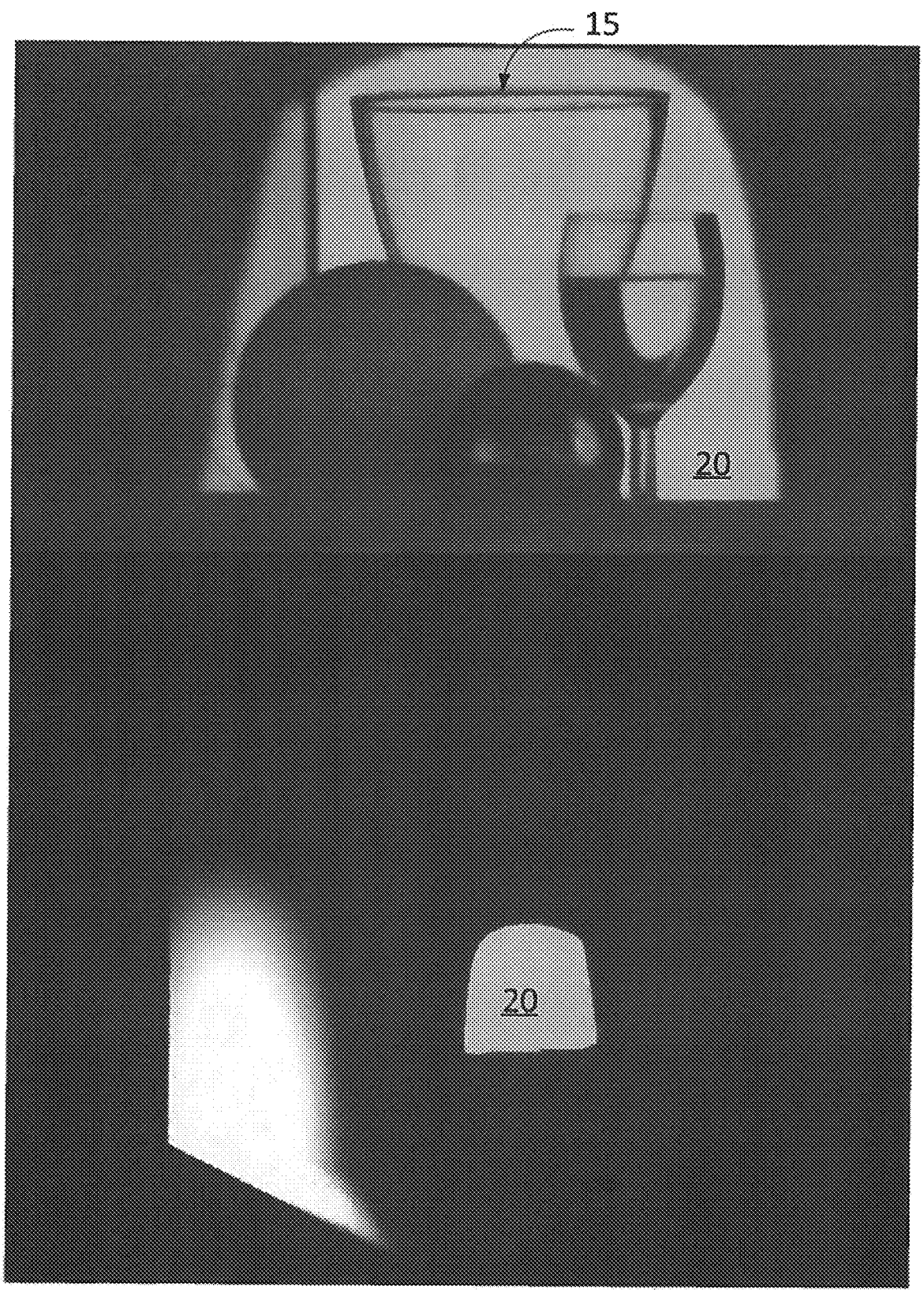
FIG. 7 is a comparative picture of the projected images on the dome as viewed from inside with a subject and from outside the dome, according to an embodiment.
Figure 8:
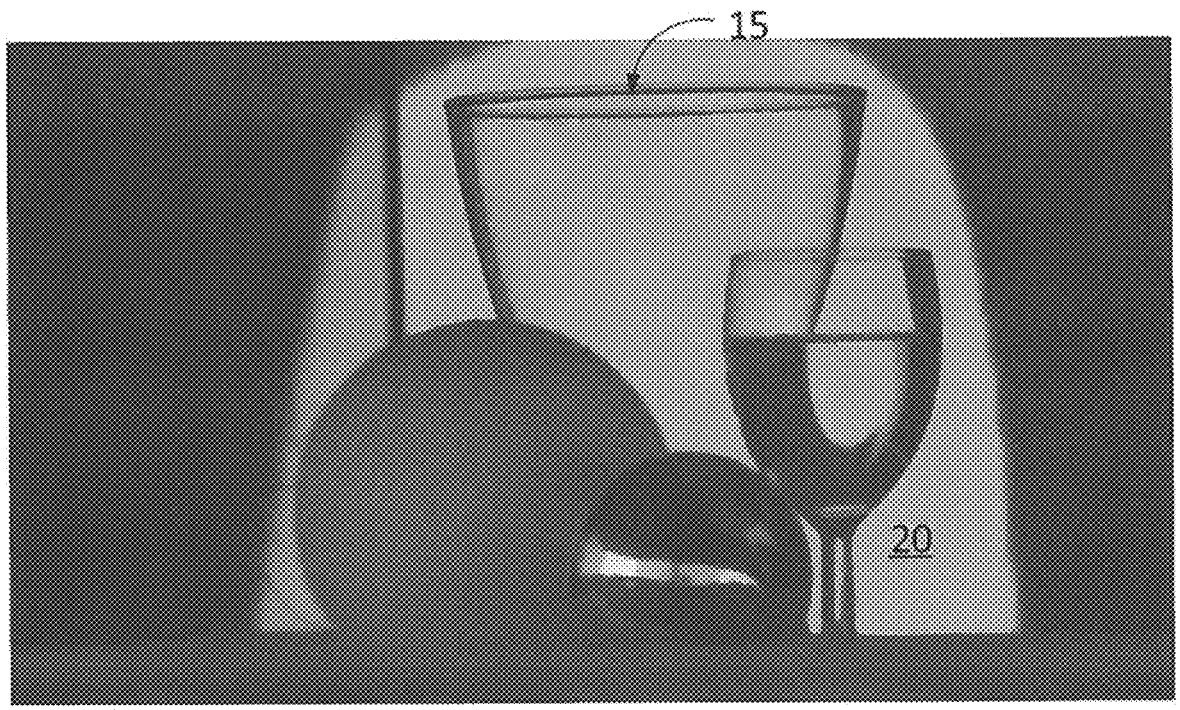
FIG. 8 is a picture of the subject filmed in the dome with a withdrawable background behind it, according to an embodiment.

The green background, or more generally the withdrawable background 20 (i.e., a background presenting sufficient uniformity or a pattern to be recognized being the background and removed from the image during compositing) is a part of the image actively projected onto the dome 10 from the outside. The withdrawable background portion 20 covers only a necessary fraction of the dome surface, intended to be the part of the dome that is visible around the subject being filmed in order to identify the contour of the subject 15 and separate the subject from the background during compositing. The withdrawable background portion 20 is shown in FIGS. 5-6. How the withdrawable background portion 20 is viewed with the subject 15 in front of it is shown in FIGS. 7-8, 14-15, 17 and 20.

This withdrawable background portion 20 is created by light projection instead of being a material object (i.e., a screen with a fabric of a particular color) as in the prior art. Therefore, it is possible to adjust the exact color and intensity of the withdrawable background being projected behind and around the subject 15, as shown in FIGS. 7-8, 14-15, 17 and 20. For example, if the general lighting conditions are of low intensity, the withdrawable background portion 20 can be projected with a low intensity too to avoid green-color spilling back onto the subject. The color can also be adjusted easily to fit with the subject 15 and scene background 30 for optimal capture of the subject's image. According to an embodiment, the shape of the withdrawable background 20 can be modified in real time to cover the displacements of the subject or actor on stage.

The method therefore comprises three stages. First, scene illumination is captured. This can be done in various ways, but high-dynamic range imagery (HDRI) technology has proven to be appropriate for the purpose of capturing 360° panoramic pictures from a scene environment because of the high range of light intensity that generally occur over a panoramic picture. The scene environment is typically remote from the filming environment and is the scene in which a filmed subject is to be inserted for the purpose of motion picture. The scene environment is captured into a background plate 30 by filming all around a point in space in the scene environment. The point in space is the location that the subject 15 is intended to have in the final composited images. This location can vary over time as the subject is shown as moving in the final composited images, in order to give the illusion that the subject 15 really is in the scene environment and is also moving therein with realistic illumination changes on the surface of the subject 15.

Then, the subject 15 is filmed. This is done inside the dome 10. The dome 10 comprises translucent panels or screens 100 used for the rendering of the image of the scene environment. Projectors are used to project, onto the translucent screens 100, the 360°-image or panoramic image of the scene environment in which the subject image will be inserted in the final composited images. Since the screens 100 are translucent, the illumination of the scene environment, being the same as the subject 15 would have received in the scene environment had he been present there, is rendered on the subject 15 inside the dome 10. Projection of the scene environment 30 onto the dome 10 and the effect of this illumination on the subject 15 is shown in FIGS. 12A-12B, 13A-13B and 16.

It should be noted that although the dome 10 is preferably a complete polyhedron or sphere that covers a solid angle of $4\pi$ steradians around the subject 15, other coverages may exist. For example, in the figures where a subject 15 is shown, the subject 15 is a small object that can fit inside the dome 10 which therefore has a complete polyhedral shape (e.g., a small stand can be provided at a center point of the dome 10 to lay the subject 15 thereon). In other cases where the subject 15 is larger or heavier, such as a person, the subject 15 needs to be supported by the floor. In this case, the floor truncates the shape of the dome 10, which has a shape of a truncated polyhedron. For example, one can contemplate a half polyhedron conscribed within a hemisphere which covers a 360° azimuth around the subject, with opening(s) 150 for camera(s) 200 and possibly for other equipment, but with the floor acting as an asymmetry plane that cuts or truncates the polyhedron. The truncation can be provided on other places through the polyhedron, preferably allowing the largest solid angle around the subject 15 where screens are present.

Other embodiments can be contemplated where the azimuthal range horizontally around the subject 15 would be less than 360°, for example between 270° and 360°. This could be useful for a better opening for camera filming or to allow large equipment to interact with the subject 15. However, the width of the dome 10 should be kept as large as possible (up to the ideal 360°) to ensure the best relighting of the subject 15. The term "dome" is nonetheless used in the current description for concision. The dome could otherwise be referred to as a set of screens, each screen extending in a respective plane, each screen being substantially equidistant to a reference point where a subject 15 is to be positioned, each screen having a shape defined by edges, where each edge of a screen is substantially joined or very close to an edge of another screen, unless the edge being considered is one that defines the bottom of the dome 10 or unless the edge being considered borders one of the opening(s) 150, in which case the edge being considered has no neighboring edge of another adjacent screen.

The subject 15 is filmed by camera(s) 200. The camera(s) 200 may be outside the dome 10, therefore opening(s) 150 may be provided in the screens 100 to allow the camera(s) 200 to film the subject 15 therein from outside, as shown in FIGS. 2-3.

Since the dome 10 is provided all around the subject 15, the camera 200 filming the subject also captures the screen 100 located behind the subject from the camera's perspective. If the scene environment is projected onto this particular screen 100, the subject 15 will be surrounded, in the images captured by the camera 200, by images of the scene environment. Cutting the subject's image for eventual image compositing is made more difficult because the scene environment would form the background that needs to be removed from the image around the subject 15. To solve this problem, a withdrawable background 20 locally replaces the scene environment images 30 projected on the screen 100 behind the subject 15. Since the positions of the camera 200 and of the subject 15 are both known, the exact location of the green area that needs to replace the scene environment on the dome 10 is known. Exact replacement of the specific area behind the subject 15 and around the subject 15 is therefore performed by a computer that produces a green spot (or a blue or other color spot or a patterned spot) that is projected onto a specific area of the dome 10 which matches the area corresponding to the projection of the subject onto the dome plus a contour therearound such as, when viewed by the camera 200, the subject 15 has a contour or "aura" that can be unambiguously removed, as shown in FIGS. 7-8, 14-15, 17 and 20. This removal is done preferably by a dedicated computer program, to isolate the subject's portion of image in the images acquired by the camera 200. The subject's portion of image is therefore captured alone, with the subject 15 exposed to the illumination he would have had in the scene environment, thanks to the images from the scene environment projected on most of the dome 10.

A computer program implemented in a computer should be able to determine which portion on the screens 100 corresponds to the area behind the subject 15 when viewed from the camera 200. It should further identify an area corresponding to a contour around the subject. This contour can have an angular width around the subject that is small enough to ensure that the screens are mostly used for lighting the scene environment and not only green color. However, it should also be large enough to allow for hard-to-predict or spontaneous movements of the subject as well as being large enough to perform efficiently and unambiguously the isolation of the subject's image in the contents filmed (or photographed) by the camera 200. The projection onto the screens for both areas is then replaced with the withdrawable background. In an embodiment, only the area corresponding to the contour around the subject 15 can be re-paced with the withdrawable background, as this is the only one needed for isolation of the subject's image. However, this would not allow for subject's movements and also not allow the use on transparent subjects, hence the replacement of the area behind the subject by the withdrawable background.

Figure 9:
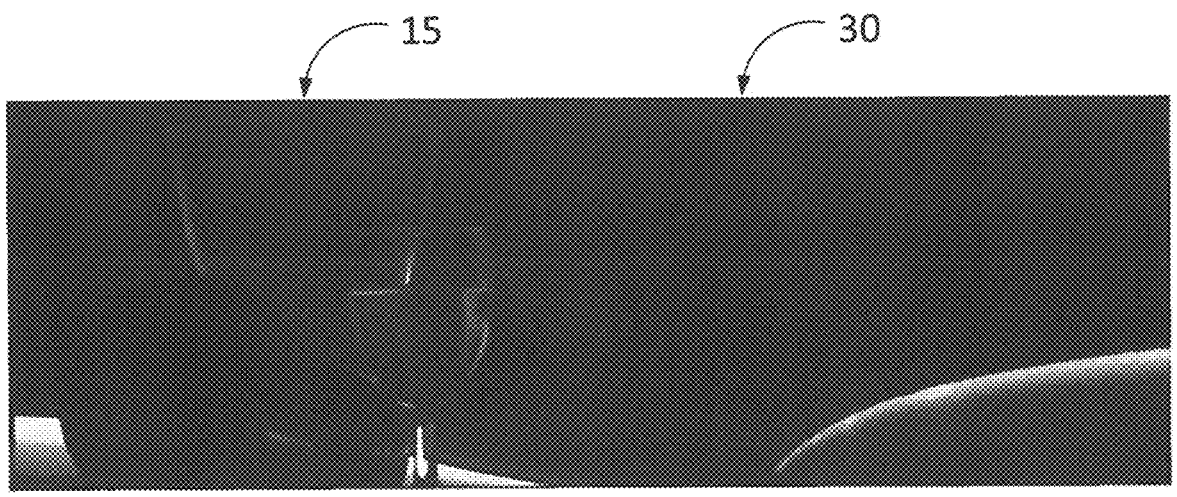
FIGS. 9-11 are pictures illustrating composited images of the subject introduced into a background plate, according to an embodiment.
Figure 10:
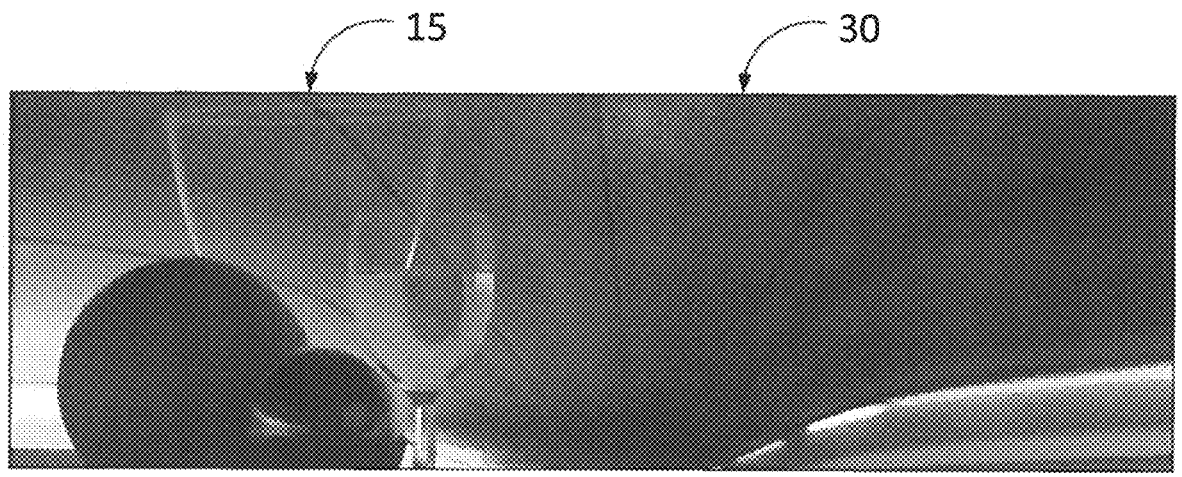
Figure 11:
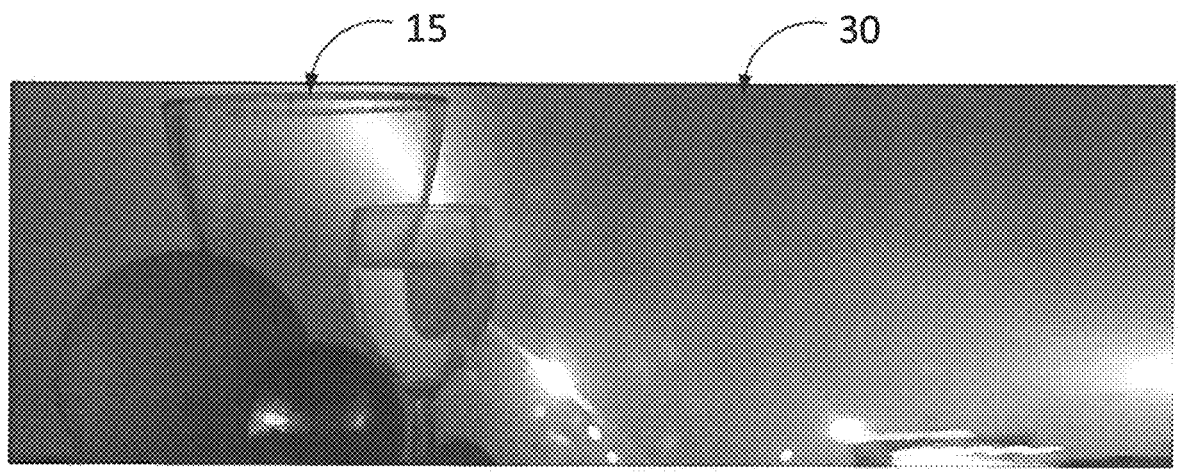
Figure 12A:
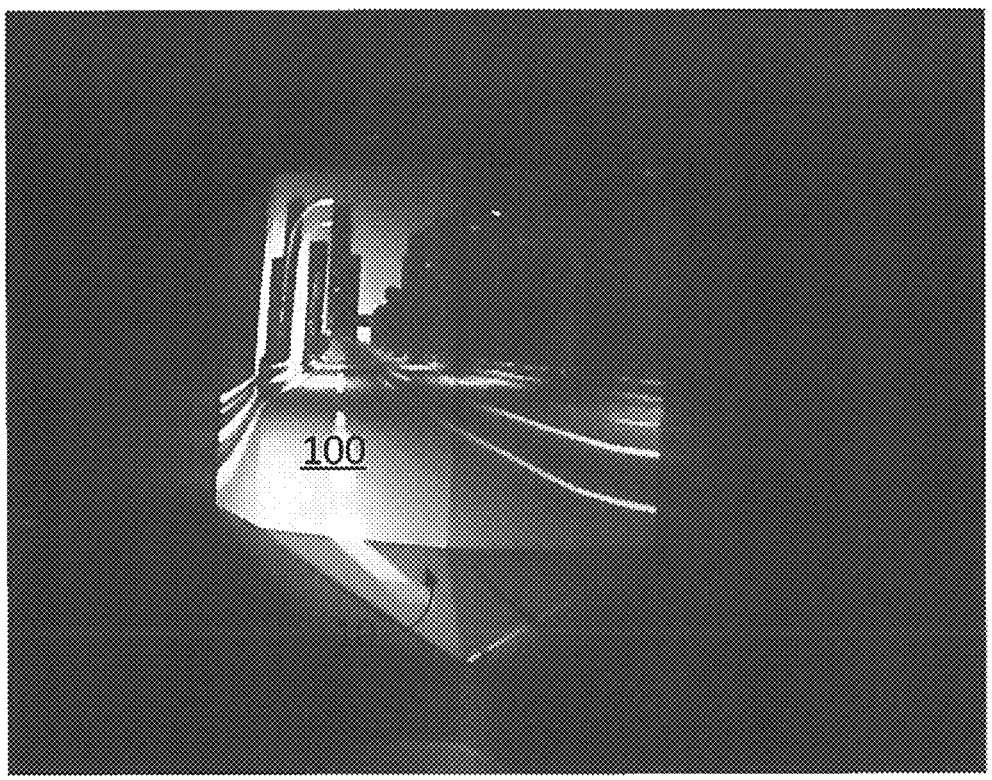
FIGS. 12A-12B are pictures of the projected images on the dome as viewed from outside the dome and from inside with a subject, according to an embodiment.
Figure 12B:
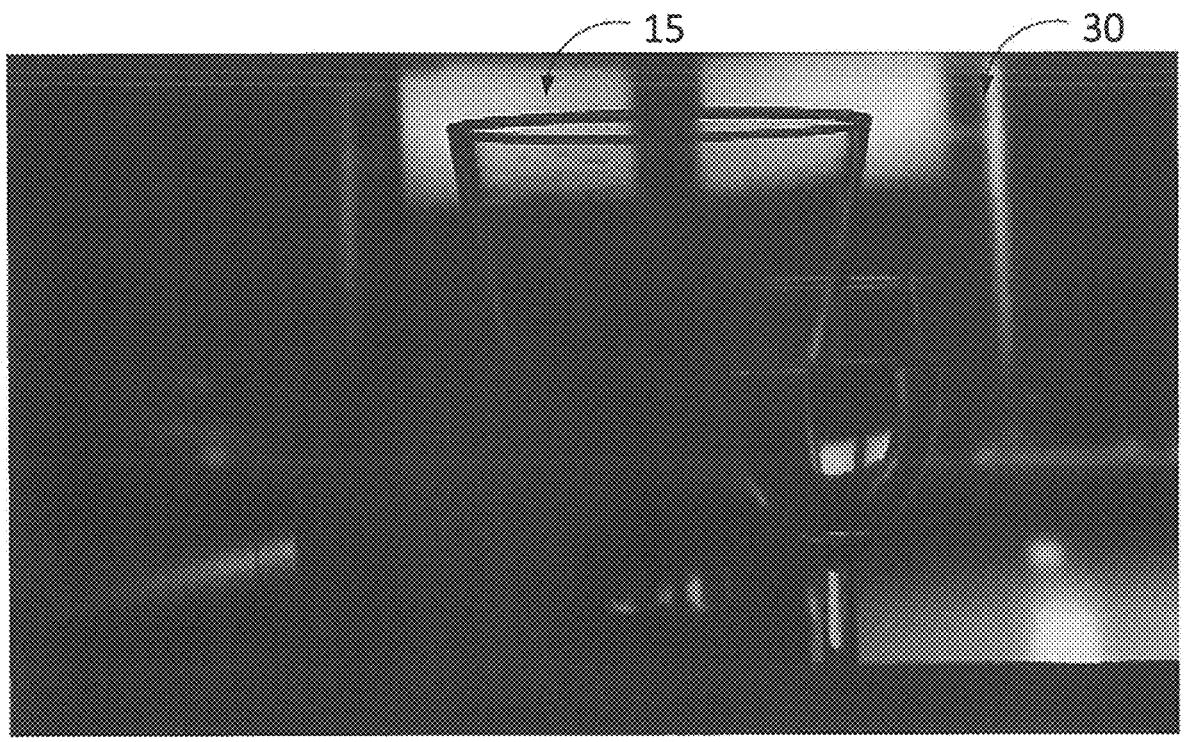
Figure 13A:
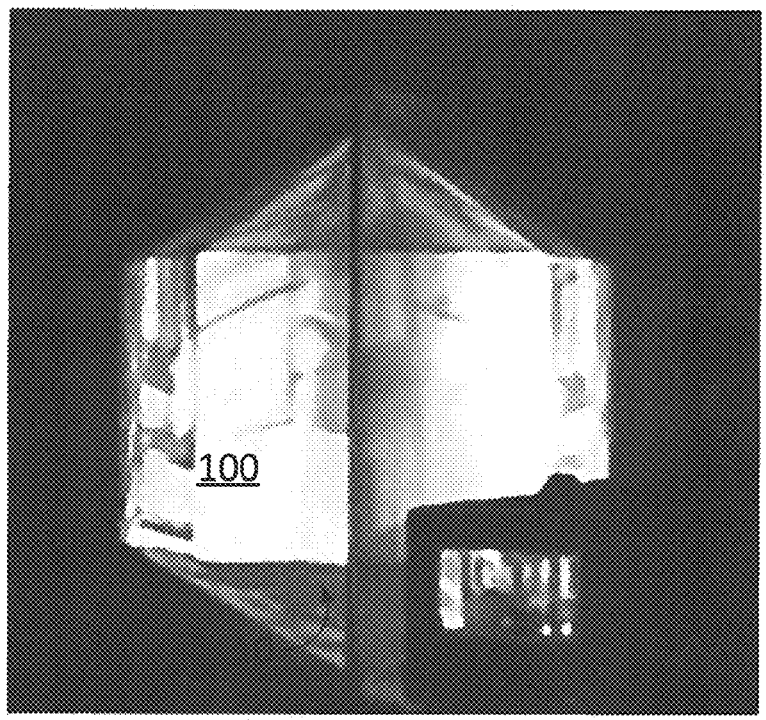
FIGS. 13A-13B are pictures of the projected images on the dome as viewed from outside the dome and from inside with a subject, according to an embodiment.
Figure 13B:
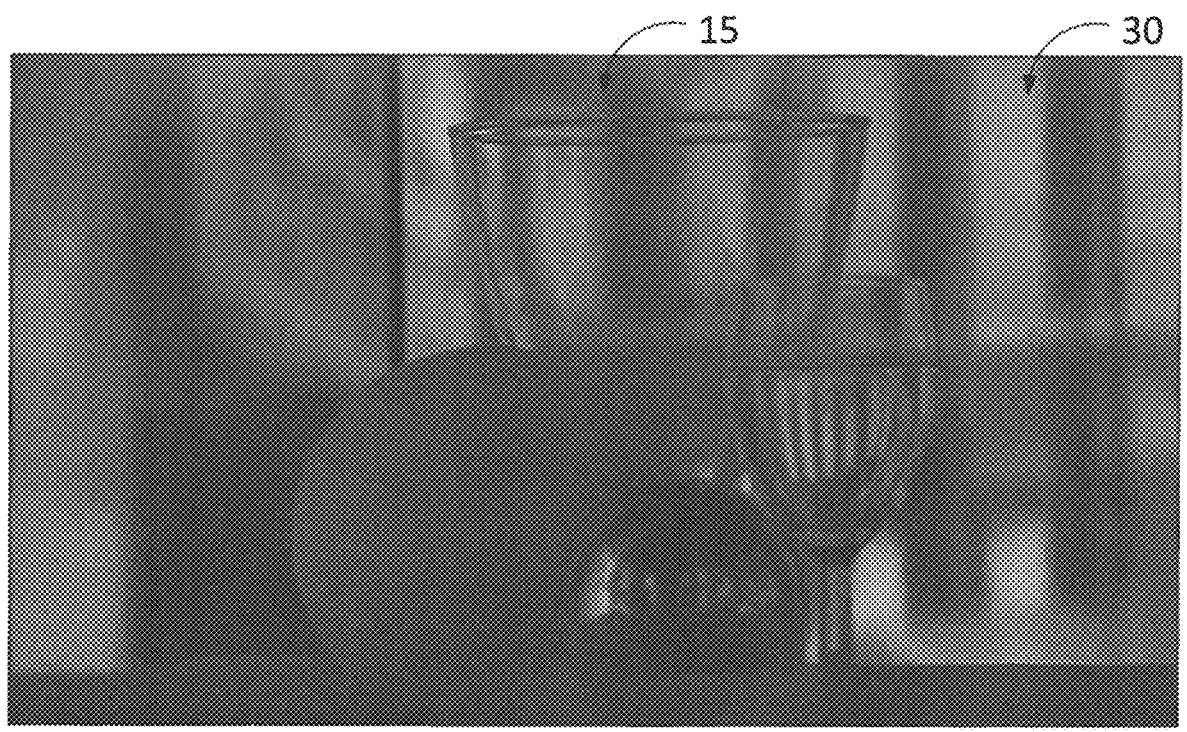
Figure 14:
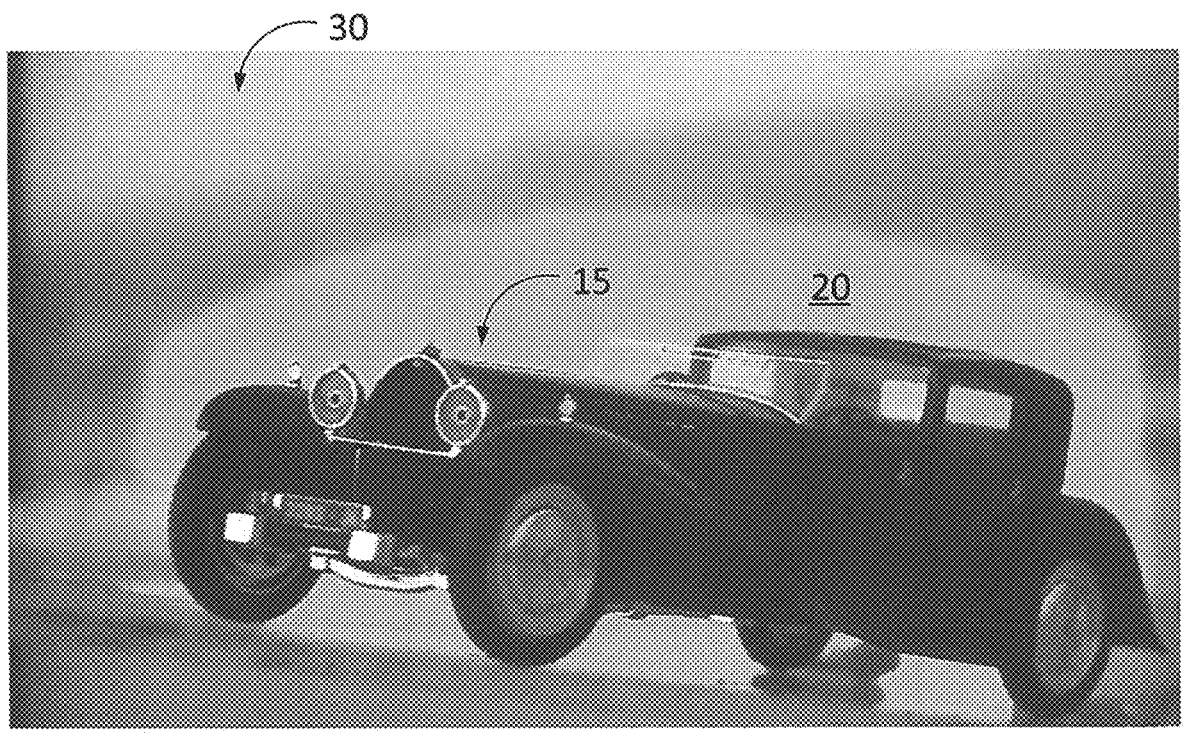
FIGS. 14-15 are pictures of the subject filmed in the dome with a withdrawable background behind it with two different illuminations, according to an embodiment.
Figure 15:
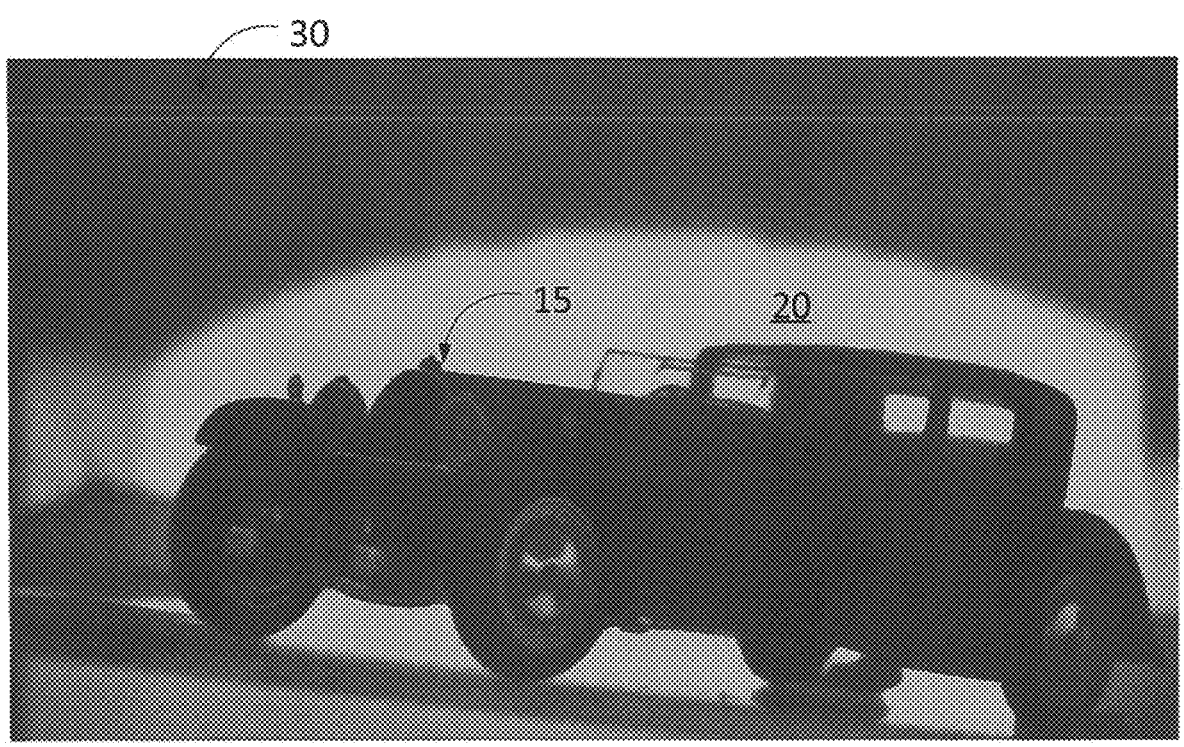
Figure 16:
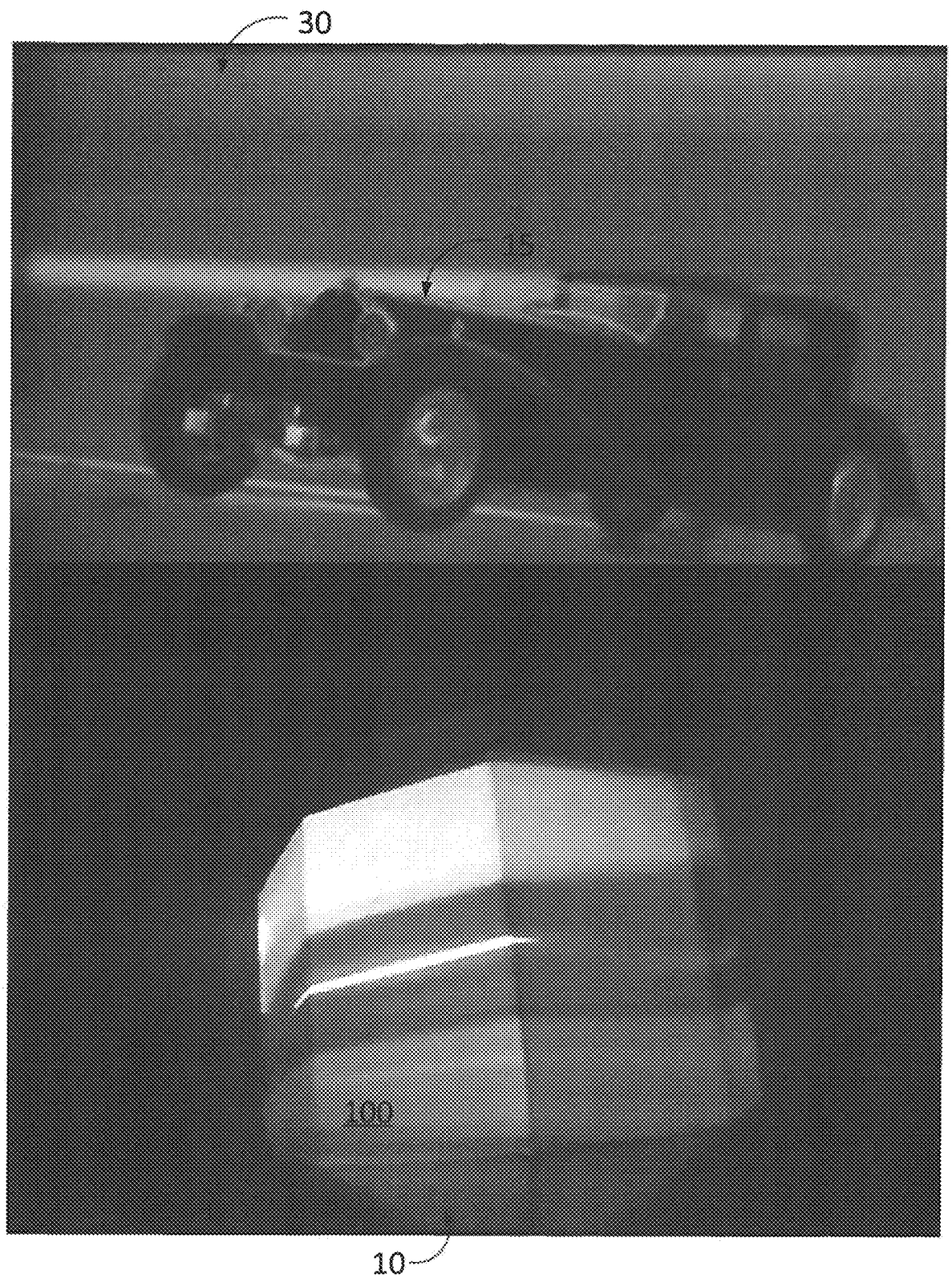
FIG. 16 is a comparative picture of the projected images on the dome as viewed from inside with a subject and from outside the dome, according to an embodiment.
Figure 17:
FIGS. 17-18 are pictures of the subject filmed in the dome with a withdrawable background behind it and the resulting composited image, according to an embodiment.
Figure 18:
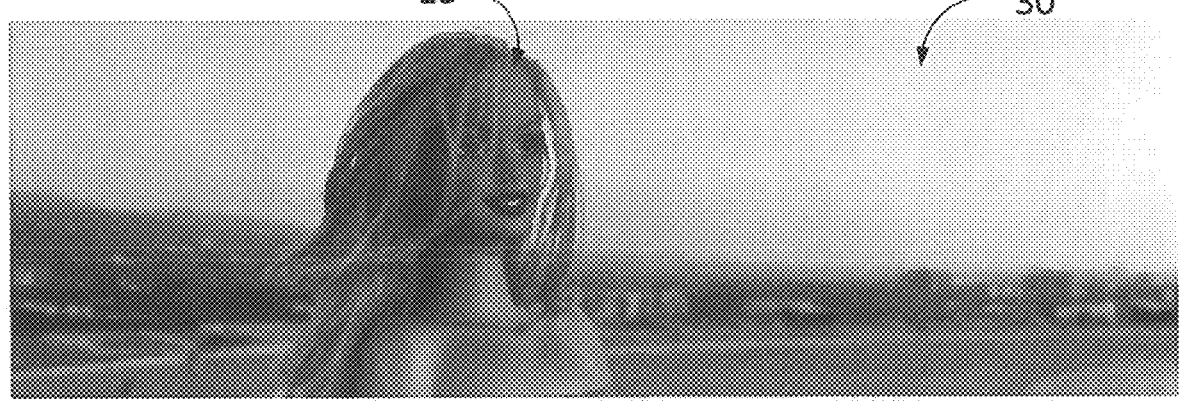
Figure 19:
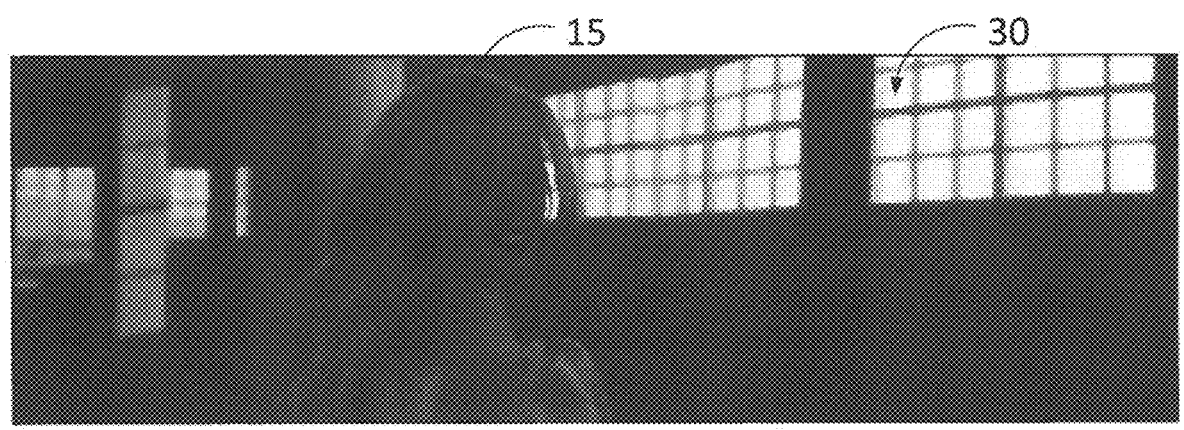
FIG. 19 is a picture of the composited image made with a subject filmed in the dome with a different illumination from that of FIGS. 17-18, according to an embodiment.
Figure 20:
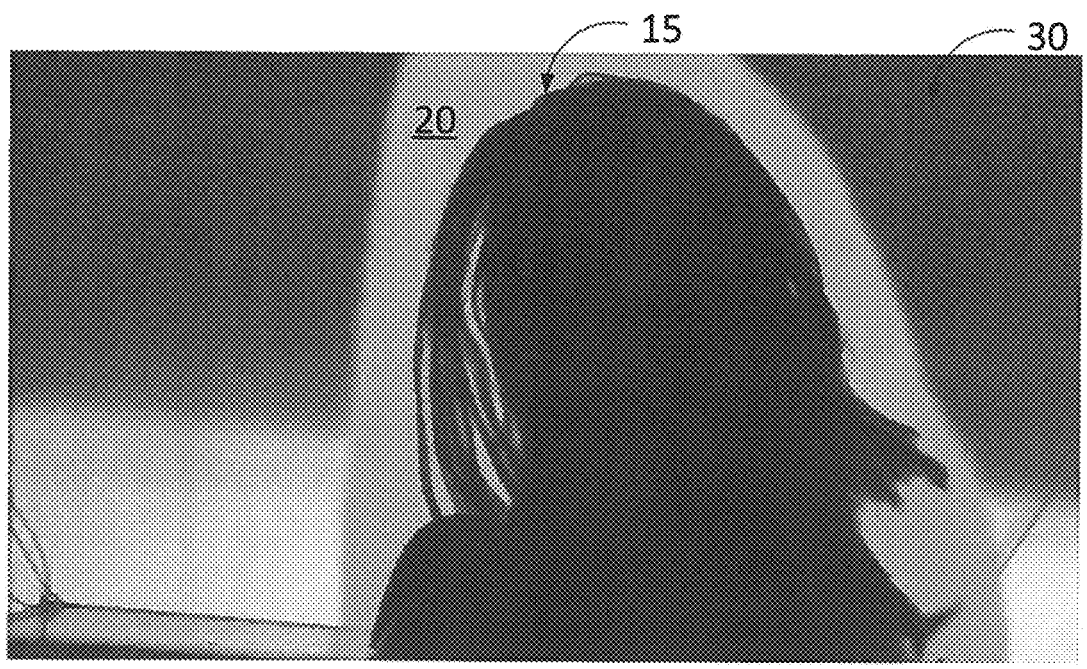
FIGS. 20-21 are pictures of the subject filmed in the dome with a withdrawable background behind it and the resulting composited image, according to an embodiment.
Figure 21:
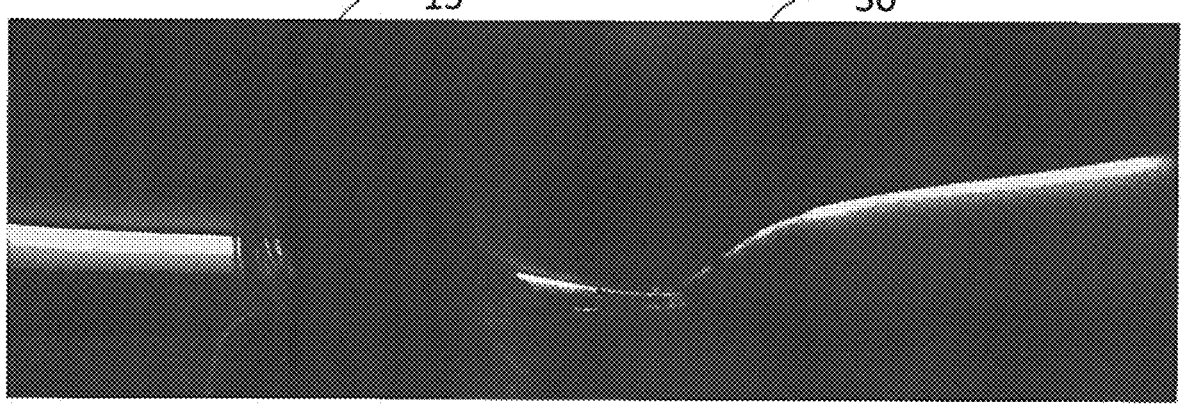
Figure 22:
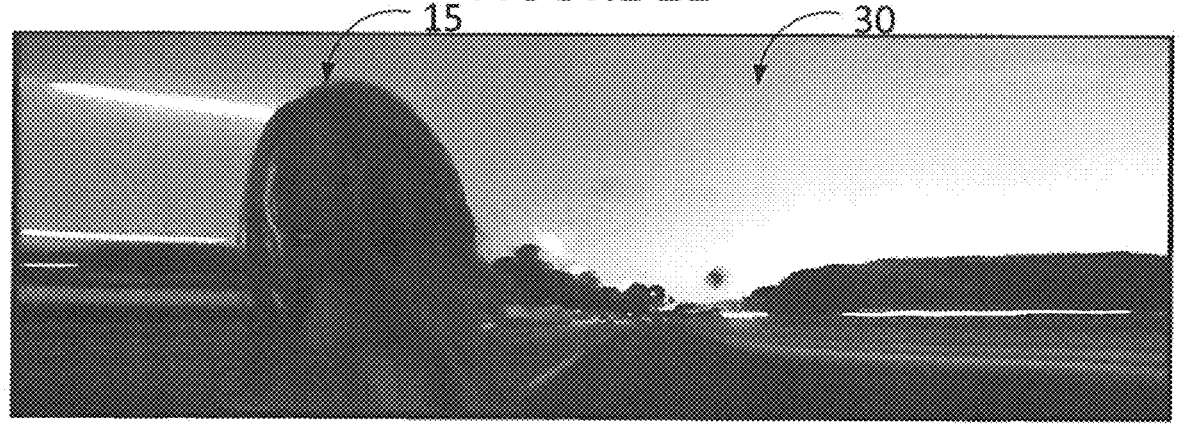
FIG. 22 is a picture of the composited image made with a subject filmed in the dome with a different illumination from that of FIGS. 20-21, according to an embodiment.

After having filmed the subject 15, a software tool can be used to isolate the subject 15 from the withdrawable background 20 using an algorithm that identifies the withdrawable background (e.g., uniform green color) around the subject 15 and keeps only what lies within, i.e., the image of the isolated subject 15. The images of the isolated subject 15 in the video can be kept and introduced over the corresponding images of the scene environment that was filmed, thereby forming the composited images for the resulting video, as shown in FIGS. 18 and 21 (which follows the images filmed by the camera 200 in FIGS. 17 and 20, respectively), or alternatively in FIGS. 18-19 and 21-22 for other scenes. FIGS. 9-11 also show the result of composition for the transparent subject 15 filmed as in FIG. 8. The corresponding images of the scene environment 30 are those in which the subject 15 is intended to be inserted; the subject's image should be inserted in the image of the scene environment that was used to illuminate the subject 15 with the dome 10 for this subject's image. FIGS. 23A-26B also show the original scene environment 30 and the result after composition with a subject's image.

The absence of LEDs directly illuminating the subject 15 prevents the flares and back reflections expected when LEDs are used. Indeed, the dome 10 is usable with reflective and transparent subjects, as shown in FIGS. 7-11, 12B, 13B, 14-16. This includes glass-made objects, mirrored objects, cars (inside and outside), etc. The presence of screens 100 for relighting prevents direct reflections that makes flares and flashes when the camera 200 is in the axis of reflection of one of the LEDs that would be reflected directly by the subject. Moreover, if LEDs are used for rendering a scene illumination as in U.S. Pat. No. 7,044,613, a moiré pattern may appear in the pictures of the subject 15. This moiré pattern is an artifact of the direct light of the various LEDs projected on the subject 15, or when the camera 200 is moving in relation to the subject 15. This defect in the pictures is very hard, if not impossible, to remove from the pictures in post-production. Given the relighting performed by the screens 100 in the presently described apparatus, this undesirable effect does not occur.

The use of the dome 10 allows to "paint" the necessary surface of green color or other suitable withdrawable background behind and especially around the contour of the subject 15 when viewed from the camera 200. The adjustability of the intensity of the withdrawable background with respect to the overall luminosity of the projected illumination from the scene environment prevents the appearance of green color (or other color from the withdrawable background) spilling back onto the subject 15. High-quality projections are made possible by recent advancements in image projection; notably, color, luminosity and contrasts can be controlled with a very high quality, and filters and image stretching can also be performed with a very high quality. The controls and operations on image projections are the same as for the color grading performed at the post-production stage in the motion picture industry. Workers in the field can advantageously use their post-production skills on these controls and operations but at the filming stage.

The overall effect of these advantages is to reduce the working time needed in post-production to remove defects in the composited images. Interestingly, if the computer systems dealing with the cameras 200 and projectors 300 are also provided with post-production tools, the operations normally carried out in post-production can rather be performed during filming. The post-production tools can thus be used in real time and allow skipping the post-production stage.

The projectors 300 can be the same projector as those for projecting a movie in a movie theater, and in combination with the translucent screens 100, should achieve a greater quality in scene illumination reproduction on the subject and therefore a composited image with a greater quality, or at least with a similar quality as the LEDs but requiring less work at the post-production stage.

The dome 10 allows for the illumination of the subject 15 substantially around the subject, with the exceptions of the withdrawable background and the floor.

In order to coordinate everything, a computer, or computing systems (many computers connected together to better allow various tasks to be performed simultaneously or by different people), are used to receive data to and send instructions from various pieces of equipment. A computer-executable method should be encoded as a program stored on a memory, while a processor in communication with the memory is for executing the instructions in the program and ensure communications, through various communication ports (input/output), with the pieces of equipment such as the camera(s) 200, the projectors 300, the displays, keyboards and other peripherals used by the production team, etc. The program should instruct the projectors 300 and the camera 200 to allow for a coordinated projection of images onto the screens 100 by the projectors 300 along with the filming of the subject 15 by the camera 200. Furthermore, the program should advantageously be able to isolate in real time (i.e., as the subject 15 is being filmed) the image of the subject 15 from the withdrawable background that appears around the subject 15. Real-time insertion of the isolated subject's image into the images of scene environment used to light the subject 15 can also be performed to allow for a real-time image composition (i.e., as the subject 15 is being filmed), or a slightly differed image composition (i.e., right after having filmed the subject 15, allowing to repeat the filmed segment with corrections to what is projected if needed). Required corrections to the images can therefore be performed during production. Since the illumination over the subject is realistic with respect to the scene environment in which the subject's image is to be inserted, and since the apparatus described herein minimizes green color spilling back onto the subject and other defects from the illumination environment, the post-production stage can be skipped. This allows for an overall more efficient and streamlined process that is both cheaper and faster.

Since the whole lighting environment around the subject 15 can be controlled, the overall scene illumination projected onto the screens 100 of the dome 10 can be rotated by translating the way the scene environment is mapped onto the dome 10. The overall effect is to give an illusion the camera is rotating around the subject 15 whereas both are in fact immobile with respect to the dome 10. What appears on screen as a camera movement is therefore simplified because there is in fact no movement; rotation of the camera's point of view is only simulated thanks to the change of location on which parts of the scene environment are projected on the dome.

Various zones 105, shown in FIGS. 2-5, can be mapped to predefined portions of the screens 100. The same zones 105 can be shown in the display of the console used by the production team (FIG. 5). FIGS. 5-6 show that a given zone 105 of the mapped and projected image is masked by the withdrawable background 20 (shown in green). The whole image, including the background plate 30 and the withdrawable background 20, is then projected onto the dome (FIG. 6).

Further Notes Regarding Image Capture

Image capture is the step through which the scene environment is captured—the scene environment, or background plate, in which the subject 15 is to be inserted eventually. The whole pictures captured during this step will then be projected by the projectors 300 on the screens 100 that will relight the appropriate illumination onto the subject to be filmed.

Figure 23A:
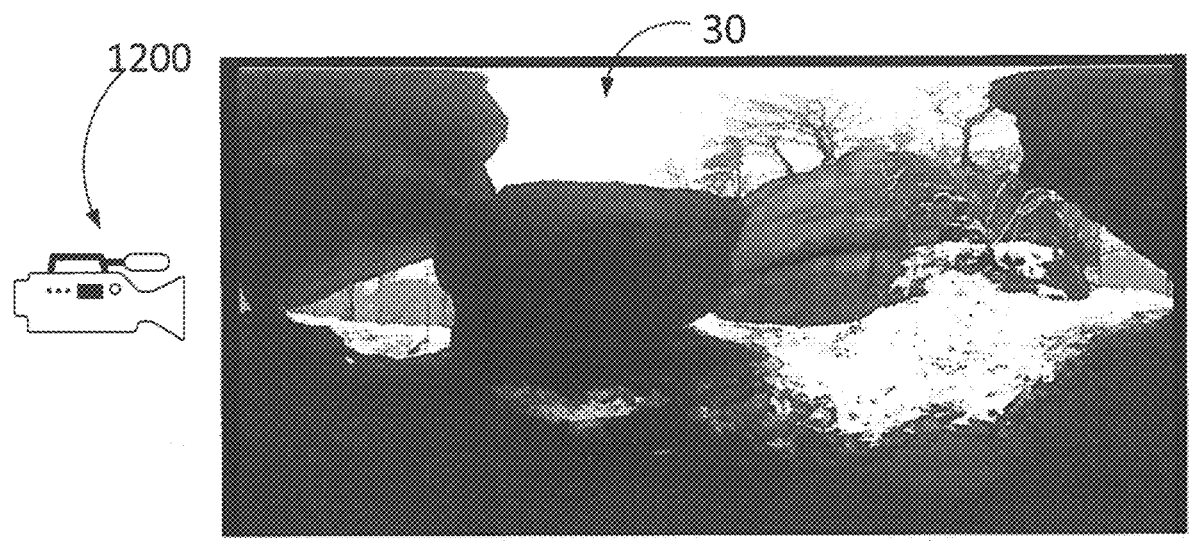
FIGS. 23A-26B are pictures of the captured scene environment and the resulting composited image using a subject photographed using the dome, according to an embodiment.
Figure 23B:
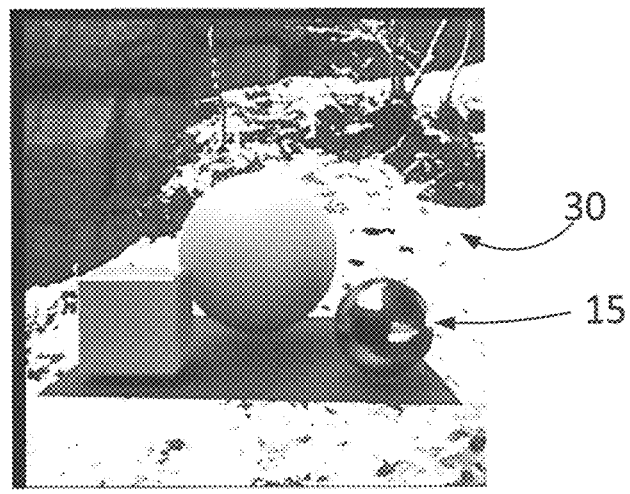
Figure 24A:
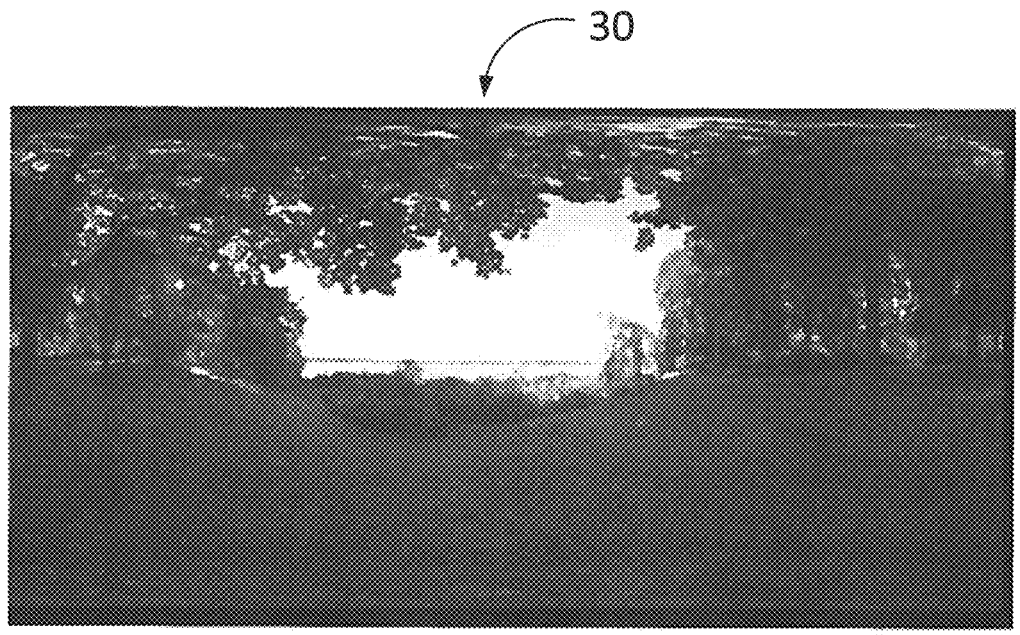
Figure 24B:
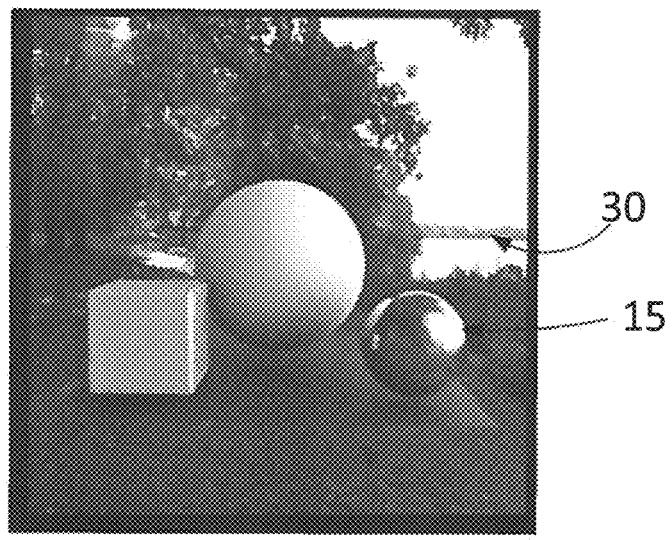
Figure 25A:
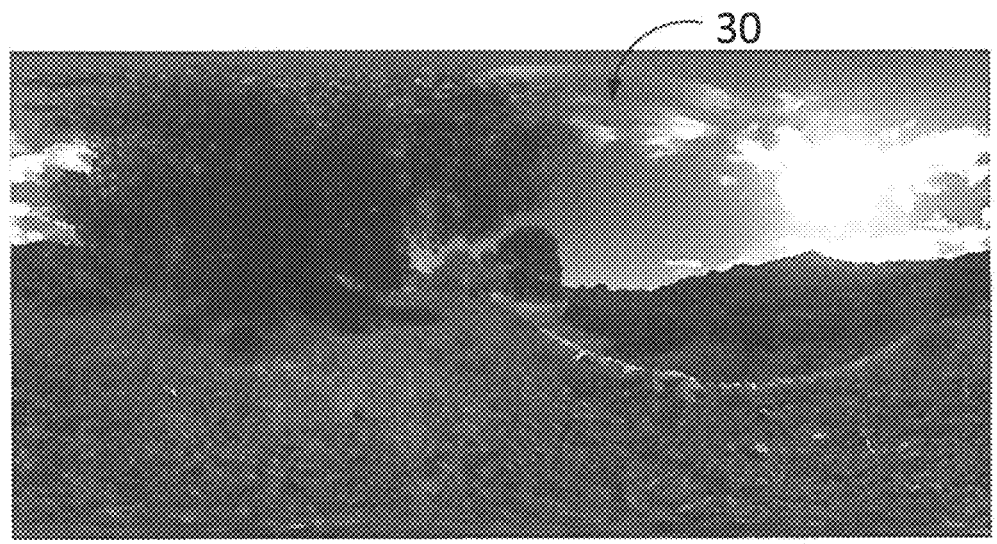
Figure 25B:
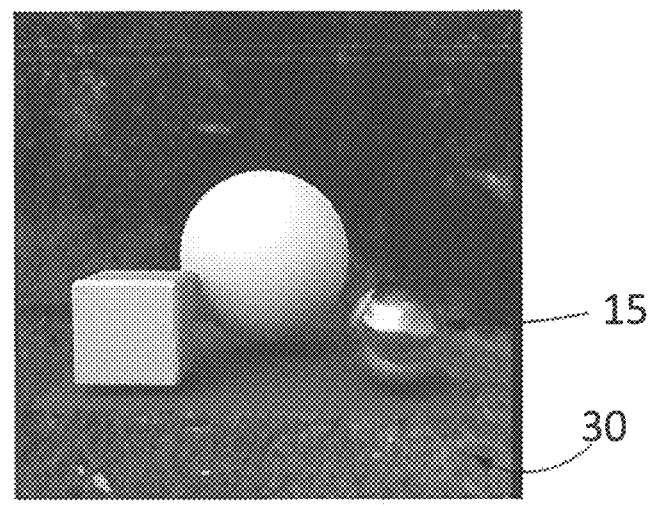
Figure 26A:
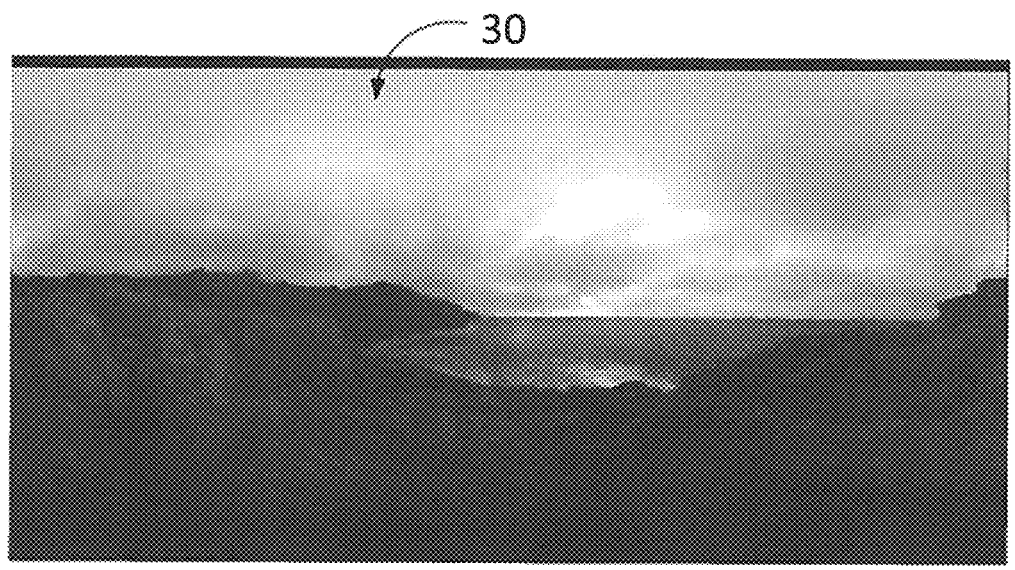
Figure 26B:
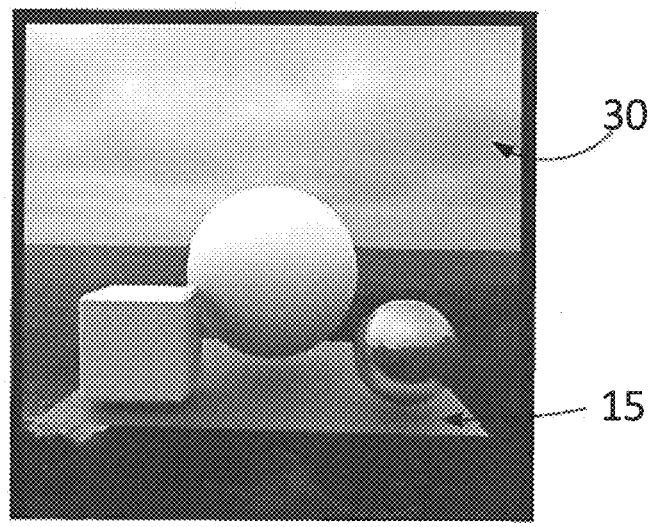

According to an embodiment, a HDRI 360 technique is used for image capture of the scene environment. A camera 1200 is used for filming the scene in this environment, as shown in FIG. 23A. A rotating member can be used as a support for the camera 1200 to allow the camera to rotate. Image should be captured in a 360° panoramic fashion.

The camera 1200 should be movable to allow capturing scenes in which the subject 15 would be expected to move, e.g., a car on the road. The variations of illuminations on the route supposed to be taken by the car will therefore be captured and later applied to the car as a subject 15 being filmed in the dome 10.

The camera 1200 can be used in combination with a mirror ball to get panoramic images.

The camera 1200 can be used in combination with an integrated recorder or with a recorder located outside the camera 1200.

The camera 1200 should be made to allow a change of lenses, since the choice of lens has an impact on the quality of the HDRI images, The camera 1200 and other devices uses with it should be lightweight and compact for transportation to remote places.

The camera 1200 should have the same position in relation to the spot where the subject 15 is to be simulated as the projectors 300 in relation to the actual subject 15.

Various embodiments may exist at this stage. Filming by the camera 1200 can be multi format (12×4 k); it can have a dynamic range from −20 to 23 F-stops; images can be taken as 10 to 16 t bit RAW images, from 24 fps to 120 fps.

Further Notes Regarding the Dome

The dome can be provided in various sizes. For example, the dome can have a diameter of 2 to 4 meters for performing packshots or portraits. The dome can also have a larger size. For example, a diameter of 7 to 10 meters can be suitable for filming moving people as the object, as in movie filming. More generally, the dome 10 could be as small as 3 meters wide, and as large as 20 meters or even more, although the dome 10 should preferably supports its own weight and therefore should be kept under a reasonable size.

Screens 100 can be made of fabrics, plastics or other similar material suitable for relighting inside the dome, i.e., any translucent material that can form lightweight screens around the subject 15.

The material, thickness, or any other property of the screens 100 can be chosen to adjust how the light is relighted onto the subject (i.e., to adjust intensity). The material of the screens 100 should however remain color-neutral in all cases.

The dome 10 should comprise an access to the inside of the dome 10 so the subject 15 can be in it. For example, one or some of the screens 100 can be removable or openable to act like a door.

Joints between screens 100 (i.e., edges of the polyhedron) should be kept thin to avoid these joints to alter the projected illumination onto the subject 15. Opaque panels 110, shown in FIG. 1, can be added to the dome 10 to prevent the light projected on a given screen 100 to spill on a neighboring screen.

Equipment used inside the dome 10 should preferably be transparent or translucent to avoid altering the lighting environment inside the dome 10.

Mounting the dome may imply inflating and deflating some portions such as the screens 100. A controlling device should be provided for controlling the pressure of these elements.

Equipment for noise reduction can be provided in order to damp the noise emitted by the projectors 300 or the air pressurizers used for the screens 100.

The shape of the dome can vary. Since the dome 10 is formed of screens 100, the shape should usually be polyhedral. The joints between screens 100 make up edges and vertices. For example, the dome 10 can be shaped as a tetrahedron (4 screens), a cube (8 screens), a dodecahedron (12 screens), etc., and more generally a truncated polyhedron (i.e., cut by the floor acting as a truncation plane), with a corresponding number of projectors 300, i.e., one projector 300 for each screen 100, preferably, for better image reproduction, although it can be different. For example, in FIG. 1, each projector 300 projects on nine adjacent screens. Alternatively, a screen can undergo projection from more than one projector (e.g., each projector being directed to an area of that screen, or each projector being for projecting a particular color). A screen can be removed from the count if there is no bottom screen on the floor (i.e., the truncated dome mentioned above).

The relighting of a scene environment onto the subject 15 is done using screens. While the screens 100 can be disjoined, they are preferably provided as contiguous panels joined together by the edges that each screen shares with its neighboring screen(s). This contiguity of the screens forms the polyhedron mentioned above, Otherwise, in another embodiment, the screen can be a single screen having a shape of a surface portion of a sphere which surrounds the subject 15. This shape, not shown, may be more difficult to achieve in practice but is suitable for relighting the scene environment. In this case, the term "screens" (used in the plural form) refers to portions which together form the single screen.

In all cases, the screens should have a sufficient coverage in solid angle to substantially form a closed space inside which the subject 15 is photographed or preferably filmed by the camera, this closed space defining an inside, where the subject 15 is located, and an outside, where the projectors 300 are located. The screens 100 are thus forming a closed environment which is subject to projection from the outside for relighting inside by the translucent material forming the screens 100.

A dome supporting structure 12 may also be provided for supporting the dome 10. The dome supporting structure 12 may be substantially larger in size than the dome 10. The dome supporting structure 12 could therefore support the projectors 300, while wires or other supporting means can be used to hold the dome 10 in place within the field of projection of the projectors 300. The dome supporting structure 12 can also have a polyhedral shape, e.g., an icosahedral shape for supporting a dodecahedral dome.

If the dome supporting structure 12 is also a polyhedral, it has vertices which can be used for various purposes in addition to the support of the screens 100. For example, they may be a support for wires for stunt actions. For example, a given number (e.g., 20) of motorized cables, preferably digitally controlled, can be attached to the dome supporting structure 12 (e.g., to its vertices) in order to hold the subject, an object, of stunt actors and move them in every direction. This can also be used for purposes other than stunts, for example immersive experiences.

The dome supporting structure 12 may also be used as a support for a greater number of cameras for which apertures can be provided in the screens 100 to allow this greater number of cameras to film the subject from various points of view. This can be useful for 3D reconstruction. This can also be useful to determine the shadow of the subject to be added on objects, including other actors, in the scene environment making up the background plate in which the subject 15 will be inserted.

Other devices such as calibration lasers or photogrammetry measurement devices can be installed on the dome supporting structure 12.

The dome 10 may be mobile, for example, it can be installed on a platform that can move upwardly and downwardly and/or rotate to allow simulating camera movements, via a controlled illumination of the subject 15, that are hard to perform in real life.

Figure 27:
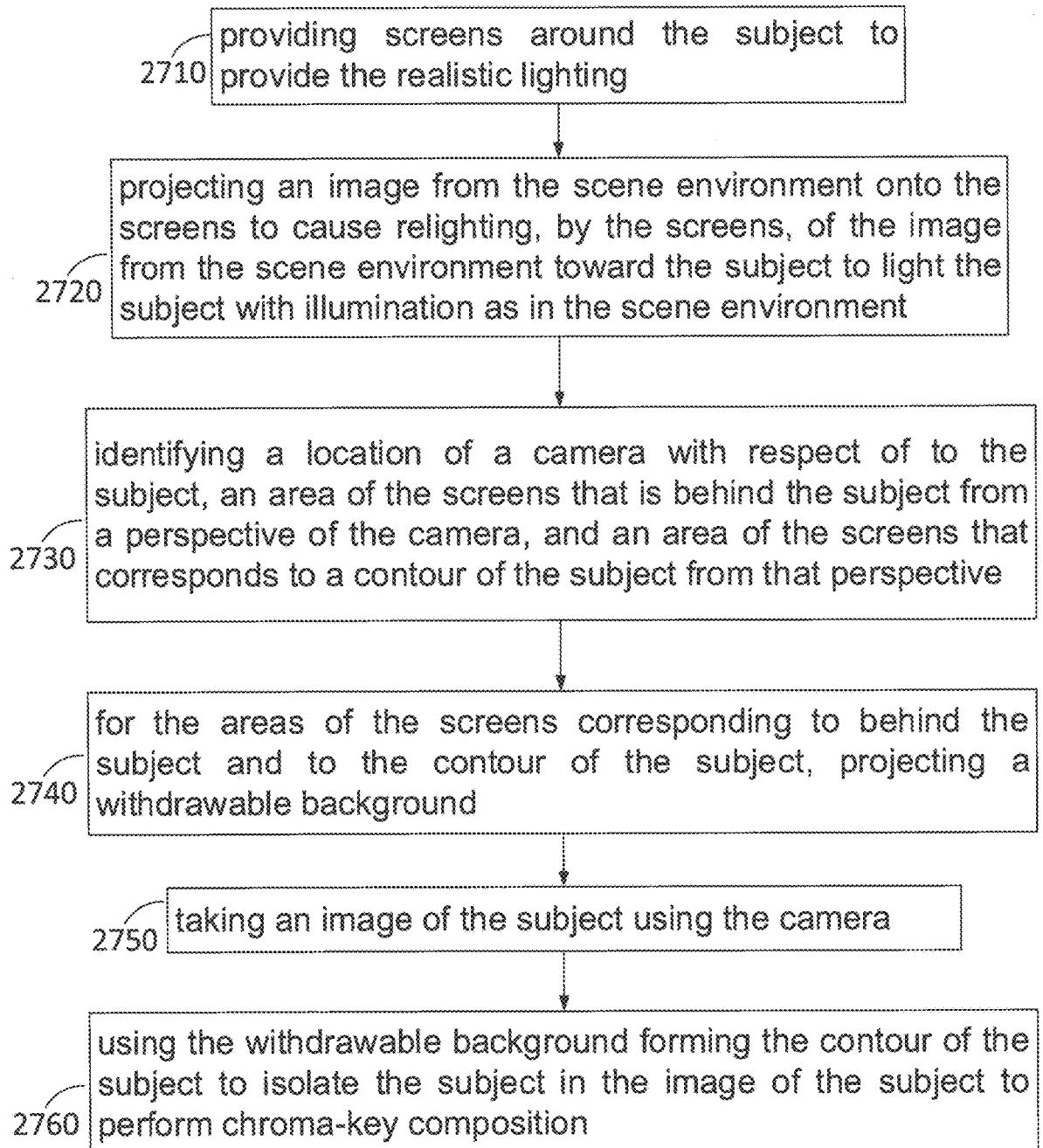
FIG. 27 is a flowchart illustrating a method for rendering a realistic lighting on a subject to undergo chroma-key compositing into a scene environment, according to an embodiment.

FIG. 27 is a flowchart that summarizes the steps that are taken to perform a more realistic lighting for chroma-key replacement.

Step 2710: providing screens 100 around the subject to provide the realistic lighting. The screens 100 are as described above.

Step 2720: projecting an image from the scene environment onto the screens 100 to cause relighting, by the screens, of the image from the scene environment toward the subject 15 to light the subject with illumination as in the scene environment. The image from the scene environment can be from a third-party source or can be captured using HDR image capture, for example. It can be dynamic, i.e., it is a film where the image changes over time. The actual projection is done on a plurality of screens (or equivalently on-screen portions), which involves computer-performed partition of the image from the scene environment for projection on the screens that form a polyhedron, a truncated polyhedron, a sphere, or any other suitable shape for the dome 10. This partition can involve:

dividing a panoramic image of the scene environment into a plurality of sub-images, each sub-image to be projected by a respective projector;

for each sub-image, determining a respective area on the screens where the sub-image is to be projected;

by each one of the projectors, projecting a respective sub-image onto the respective area on the screens.

Step 2730: identifying a location of a camera with respect of to the subject, an area of the screens that is behind the subject from a perspective of the camera, and an area of the screens that corresponds to a contour of the subject from that perspective.

Step 2740: for the areas of the screens corresponding to behind the subject and to the contour of the subject, projecting a withdrawable background, such as a green or blue spot.

Step 2750: taking an image of the subject using the camera. This can involve photographing the subject, or more often filming the subject.

Step 2760: using the withdrawable background forming the contour of the subject to isolate the subject in the image of the subject to perform chroma-key composition.

Further Notes Regarding the Control Settings

Since many techniques are used and interact together in real time, including filming a possibly moving subject, projecting a video on screens 100 that may be inflated, while image defects are removed from the images. All these steps may be performed together, in real time. Therefore, proper controls of all controllable events occurring during the filming should be provided, including any alteration (intensity, color, etc.) to what is projected onto the screens 100, on the whole surface of the dome 10 or locally. The projectors 300 should allow for a very high light intensity in case it is needed.

The control must be performed in real time, together with scene illumination projection and filming of the subject. Advantageously, compositing is also performed either simultaneously or right after the subject 15 is filmed to avoid the post-production stage. The equipment, more particularly the processing capacity and memory of the computing systems involves in these operations, should be sized accordingly to allow real time compositing (either simultaneous or slightly differed) given the size of the images that must be treated continuously. Proper displays (for visualization) and computers (for real-time image correction controls) should be provided to allow real time compositing by the production team in an ergonomic fashion. Controls for the cameras 200 and projectors 300 should be controllable by the computing systems and feed them with data at a high rate to make sure the whole process is integrated (i.e., all done together consistently).

Other elements of the lighting stage should be controlled at the same time, including pressurized air to inflate the screens 100, the cooling capacity of the equipment, the cables for stunt actions, and the like.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for rendering a realistic lighting on a subject to undergo chroma-key compositing into a scene environment, the method comprising:
   providing screens around the subject;
   projecting, onto a portion of the screens behind the subject and about a contour of the subject behind the subject, a chroma-key background which is withdrawable, and
   simultaneously projecting, onto a remainder of the screens not behind the subject and distinct from said contour, an image from the scene environment which is different from the chroma-key background,
   wherein the projecting onto the remainder of the screens not behind the subject causes relighting, by the screens, of the image from the scene environment toward the subject to light the subject with illumination as in the scene environment, the relighting being simultaneous with projecting the chroma-key background.

2. The method of claim 1, wherein the screens are translucent.

3. The method of claim 2, wherein projecting the image from the scene environment is performed by projectors.

4. The method of claim 3, wherein projecting the image from the scene environment comprises:
   dividing a panoramic image of the scene environment into a plurality of sub-images, each sub-image to be projected by a respective projector;
   for each sub-image, determining a respective area on the screens where the sub-image is to be projected;
   by each one of the respective projectors, projecting a respective sub-image onto the respective area on the screens.

5. The method of claim 1, further comprising:
   identifying a location of a camera with respect of to the subject and an area of the screens that is behind the subject from a perspective of the camera;
   identifying an area of the screens that corresponds to a contour of the subject from the perspective of the camera;
   for the areas of the screens corresponding to behind the subject and to the contour of the subject, projecting, instead of the image from the scene environment, the chroma-key background.

6. The method of claim 5, wherein projecting the chroma-key background comprises projecting a uniform color chosen from green or blue.

7. The method of claim 6, further comprising:
   taking an image of the subject using the camera;
   using the chroma-key background forming the contour of the subject to isolate the subject in the image of the subject to perform chroma-key composition.

8. The method of claim 1, wherein providing the screens around the subject comprising concentrically placing the screens substantially at an equal distance from a point where the subject is to be positioned.

9. The method of claim 1, wherein projecting the image from the scene environment comprises continually projecting the image which changes over time.

10. The method of claim 1, wherein providing the screens comprises providing screens contiguously all around the subject such that adjacent screens share their edges to form a dome.

11. The method of claim 1, further comprising, prior to projecting the image from the scene environment, capturing the image from the scene environment, wherein capturing the image from the scene environment comprises capturing a HDR 360° panoramic image.

12. A method for rendering a realistic lighting on a subject to undergo chroma-key compositing into a scene environment, the method comprising:
   providing screens around the subject to provide the realistic lighting;
   identifying a location of a camera with respect of to the subject and an area of the screens that is behind the subject from a perspective of the camera;
   identifying an area of the screens that corresponds to a contour of the subject from the perspective of the camera;
   for the areas of the screens corresponding to behind the subject and to the contour of the subject behind the subject, projecting a chroma-key background which is withdrawable,
   simultaneously projecting an image from the scene environment, different from the chroma-key background, onto a remainder of the screens, wherein the projecting causes relighting, by the screens, of the image from the scene environment toward the subject to light the subject with illumination as in the scene environment to provide the realistic lighting, the relighting being simultaneous with projecting the chroma-key background;
   taking an image of the subject using the camera; and
   using the chroma-key background forming the contour of the subject to isolate the subject in the image of the subject to perform chroma-key composition.

13. The method of claim 12, further comprising adjusting a light intensity of the withdrawable background depending on a light intensity of the scene environment.

14. An apparatus for rendering a realistic lighting on a subject to undergo chroma-key compositing into a scene image, the apparatus comprising:
   screens which are translucent, for substantially surrounding a subject located therein and defining an outside; and
   projectors for projecting on the screens, wherein a selection of the projectors behind the subject is for projecting, onto a portion of the screens behind the subject and forming the contour of the subject behind the subject, a chroma-key background which is withdrawable, wherein a remainder of the projectors not behind the subject are for simultaneously projecting an image from the scene environment, different from the chroma-key background, onto a remainder of the screens, wherein the projecting causes relighting, by the screens, of the image from the scene environment toward the subject to light the subject with illumination as in the scene environment, the relighting being simultaneous with projecting the chroma-key background;
   the screens comprising an opening to allow viewing the subject from the outside.

15. The apparatus of claim 14, wherein the screens comprise adjacent screens which share their edges.

16. The apparatus of claim 14, wherein the screens are concentrically located around the subject, substantially at an equal distance from a point where the subject is to be positioned.

17. The apparatus of claim 16, wherein screens are contiguous all around the subject to form a substantially closed dome.

18. The apparatus of claim 17, wherein the substantially closed dome has a shape of a polyhedron or a truncated polyhedron.

* * * * *